US012722736B2

(12) United States Patent
Fujii et al.

(10) Patent No.: US 12,722,736 B2
(45) Date of Patent: Sep. 1, 2026

(54) OPERATING DEVICE FOR HUMAN-POWERED VEHICLE AND HUMAN-POWERED VEHICLE

(71) Applicant: Shimano Inc., Sakai (JP)

(72) Inventors: Kazuhiro Fujii, Sakai (JP); Hiroki Kamada, Sakai (JP); Kazuyoshi Nakamura, Sakai (JP); Yuuya Yoneda, Sakai (JP)

(73) Assignee: Shimano Inc., Osaka (JP)

( * ) Notice: Subject to any disclaimer, the term of this patent is extended or adjusted under 35 U.S.C. 154(b) by 189 days.

(21) Appl. No.: 17/859,302

(22) Filed: Jul. 7, 2022

(65) Prior Publication Data

US 2023/0034449 A1 Feb. 2, 2023

(30) Foreign Application Priority Data

Jul. 30, 2021 (JP) ................................ 2021-125929
Dec. 23, 2021 (JP) ................................ 2021-209770

(51) Int. Cl.
*B62M 6/50* (2010.01)
*B62J 6/16* (2020.01)

(52) U.S. Cl.
CPC . *B62M 6/50* (2013.01); *B62J 6/16* (2013.01)

(58) Field of Classification Search
CPC ..... B62M 6/50; B62M 6/90; B62J 6/16; B62J 43/13; B62J 43/30; B62J 45/41; B62J 50/22; B62J 50/225; B62J 45/20; H01M 2010/4271
See application file for complete search history.

(56) References Cited

U.S. PATENT DOCUMENTS

| | | | |
|---|---|---|---|
| 5,798,702 | A | 8/1998 | Okamoto et al. |
| 10,933,936 | B2 | 3/2021 | Sonderegger et al. |
| 2017/0151993 | A1 | 6/2017 | Iino et al. |

(Continued)

FOREIGN PATENT DOCUMENTS

| | | | |
|---|---|---|---|
| CN | 101016076 | A | 8/2007 |
| CN | 112849320 | A | 5/2021 |

(Continued)

OTHER PUBLICATIONS

Ride with Roy, How to use the Ebikemotion IWoc Controller. As used on Ribble, Orbea and many others, 2020, youtube.com (Year: 2020).*

(Continued)

*Primary Examiner* — Aniss Chad
*Assistant Examiner* — Chase L Cooley
(74) *Attorney, Agent, or Firm* — Spencer Fane, LLP

(57) ABSTRACT

An operating device of a human-powered vehicle, the device including: an operation member; a base that is configured such that the operation member is provided to the base and at least a part of the base is embedded in a vehicle body of the human-powered vehicle; at least one interface; and a controller that is provided to the base and is electrically connected to the at least one interface, the controller being configured to cause the at least one interface to output a control command to a control-target in accordance with an operation of the operation member, wherein the controller is configured to be capable of changing at least one of the control-target and the control command.

21 Claims, 11 Drawing Sheets

(56) References Cited

U.S. PATENT DOCUMENTS

| | | | | |
|---|---|---|---|---|
| 2021/0155315 | A1* | 5/2021 | Hahn | B62J 50/225 |
| 2022/0388602 | A1* | 12/2022 | Hahn | B62M 9/132 |

FOREIGN PATENT DOCUMENTS

| | | | |
|---|---|---|---|
| DE | 196 40 248 | A1 | 10/1997 |
| DE | 10 2016 121 858 | A1 | 6/2017 |
| FR | 2654698 | A1 | 5/1991 |
| JP | 2014-182914 | A | 9/2014 |
| JP | 2015-16711 | A | 1/2015 |

OTHER PUBLICATIONS

Programming Electric Academy, Fading Multiple LEDs in Sequence with Arduino:: Viewer Question #4, 2014, youtube.com (Year: 2014).*

* cited by examiner

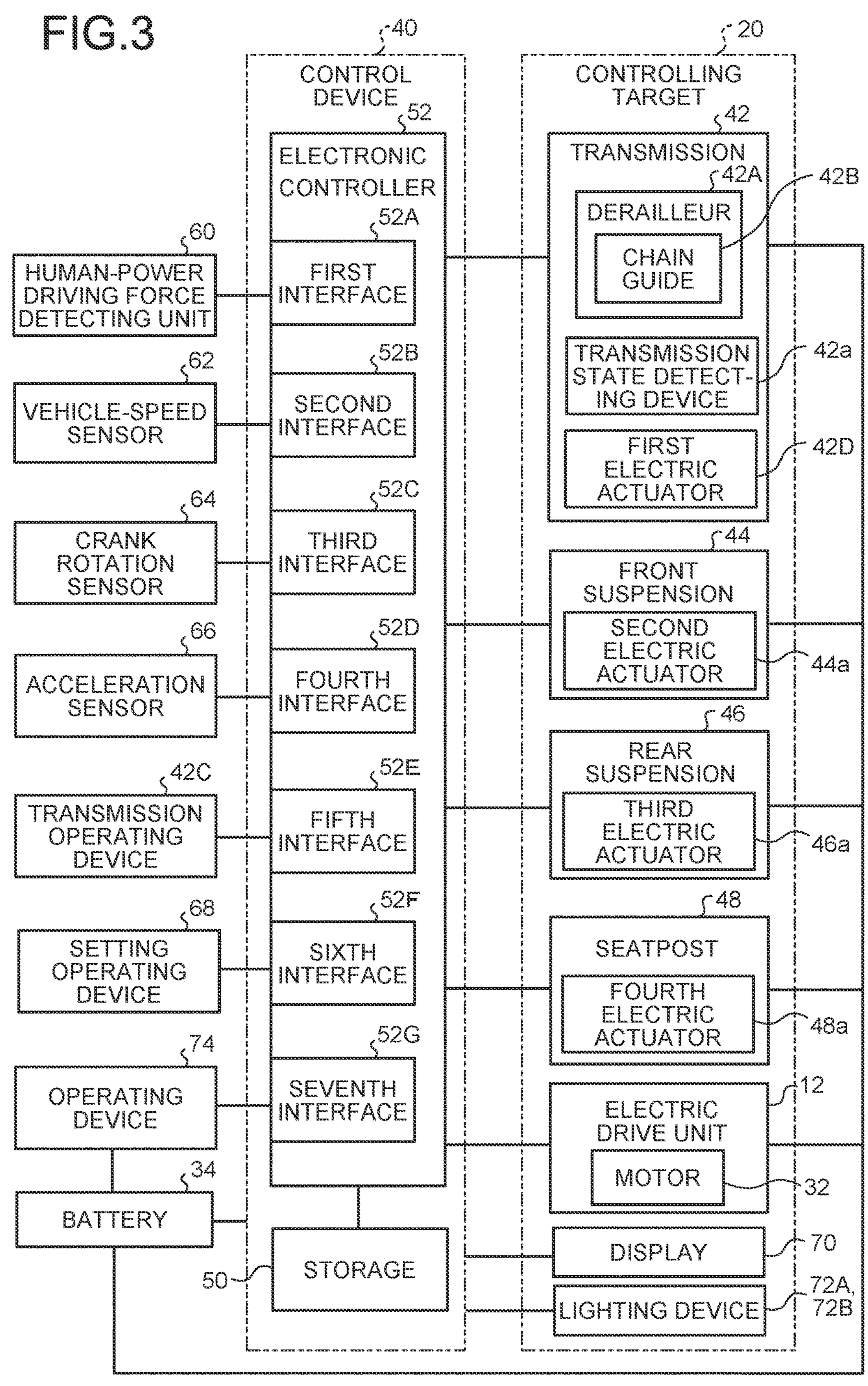
FIG.3
40
CONTROL DEVICE
20
CONTROLLING TARGET
52
ELECTRONIC CONTROLLER
52A
FIRST INTERFACE
52B
SECOND INTERFACE
52C
THIRD INTERFACE
52D
FOURTH INTERFACE
52E
FIFTH INTERFACE
52F
SIXTH INTERFACE
52G
SEVENTH INTERFACE
60
HUMAN-POWER DRIVING FORCE DETECTING UNIT
62
VEHICLE-SPEED SENSOR
64
CRANK ROTATION SENSOR
66
ACCELERATION SENSOR
42C
TRANSMISSION OPERATING DEVICE
68
SETTING OPERATING DEVICE
74
OPERATING DEVICE
34
BATTERY
50
STORAGE
42
TRANSMISSION
42A
DERAILLEUR
42B
CHAIN GUIDE
42a
TRANSMISSION STATE DETECT-ING DEVICE
42D
FIRST ELECTRIC ACTUATOR
44
FRONT SUSPENSION
SECOND ELECTRIC ACTUATOR
44a
46
REAR SUSPENSION
THIRD ELECTRIC ACTUATOR
46a
48
SEATPOST
FOURTH ELECTRIC ACTUATOR
48a
12
ELECTRIC DRIVE UNIT
MOTOR
32
DISPLAY
70
LIGHTING DEVICE
72A, 72B

FIG.9

| NUMBER OF SIMULTANEOUSLY TURNED-ON LIGHTS | 5 | 4 | 3 | 2 | 1 |
|---|---|---|---|---|---|
| On-Duty IN PWM CONTROL | 50% | 70% | 80% | 90% | 100% |

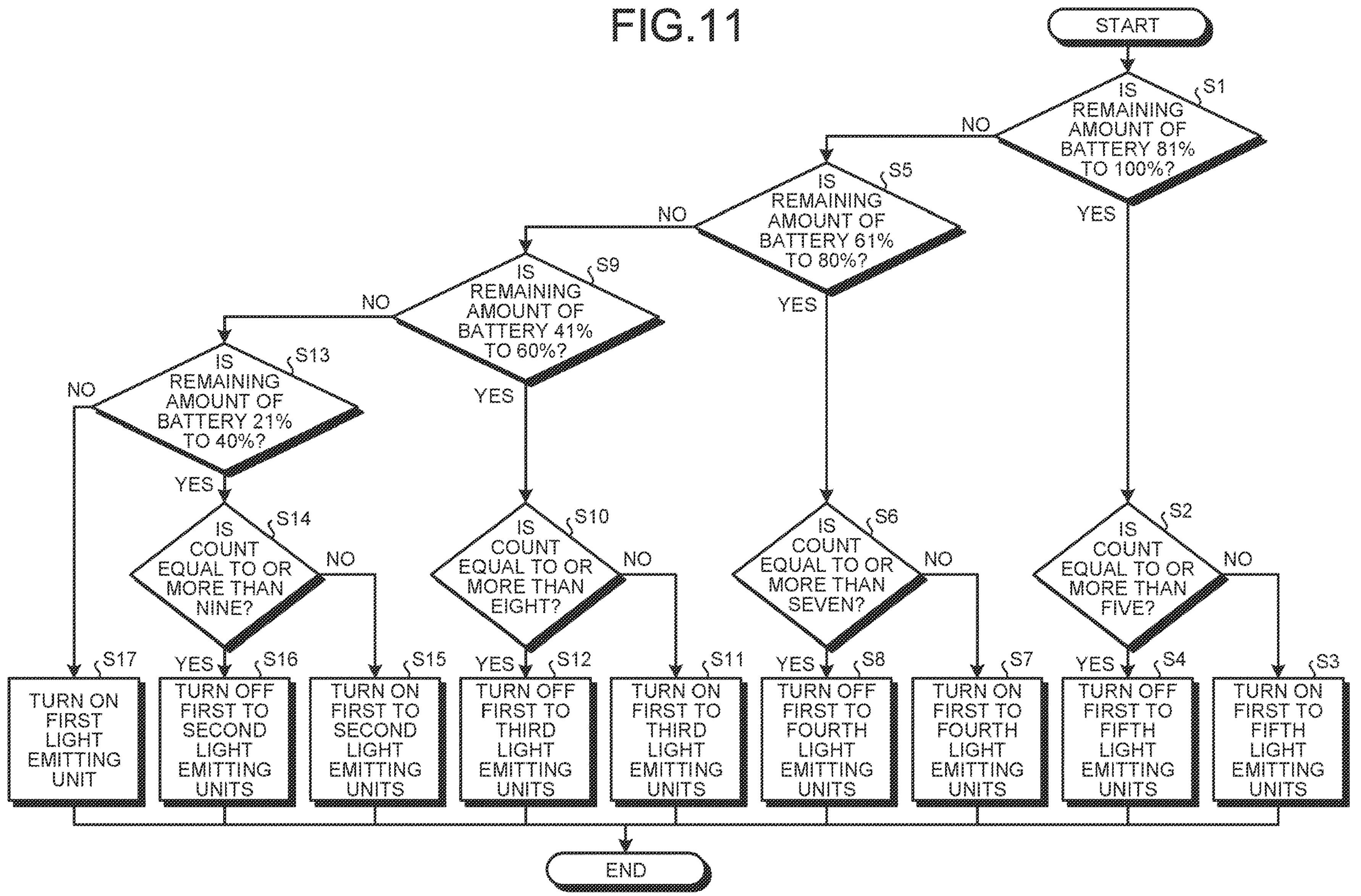
FIG.11
START
S1
IS REMAINING AMOUNT OF BATTERY 81% TO 100%?
YES
NO
S2
IS COUNT EQUAL TO OR MORE THAN FIVE?
YES
NO
S3
TURN ON FIRST TO FIFTH LIGHT EMITTING UNITS
S4
TURN OFF FIRST TO FIFTH LIGHT EMITTING UNITS
S5
IS REMAINING AMOUNT OF BATTERY 61% TO 80%?
YES
NO
S6
IS COUNT EQUAL TO OR MORE THAN SEVEN?
YES
NO
S7
TURN ON FIRST TO FOURTH LIGHT EMITTING UNITS
S8
TURN OFF FIRST TO FOURTH LIGHT EMITTING UNITS
S9
IS REMAINING AMOUNT OF BATTERY 41% TO 60%?
YES
NO
S10
IS COUNT EQUAL TO OR MORE THAN EIGHT?
YES
NO
S11
TURN ON FIRST TO THIRD LIGHT EMITTING UNITS
S12
TURN OFF FIRST TO THIRD LIGHT EMITTING UNITS
S13
IS REMAINING AMOUNT OF BATTERY 21% TO 40%?
YES
NO
S14
IS COUNT EQUAL TO OR MORE THAN NINE?
YES
NO
S15
TURN ON FIRST TO SECOND LIGHT EMITTING UNITS
S16
TURN OFF FIRST TO SECOND LIGHT EMITTING UNITS
S17
TURN ON FIRST LIGHT EMITTING UNIT
END

OPERATING DEVICE FOR HUMAN-POWERED VEHICLE AND HUMAN-POWERED VEHICLE

CROSS-REFERENCE TO RELATED APPLICATIONS

This application claims priority to Japanese Patent Application No. 2021-125929, filed on Jul. 30, 2021, Japanese Patent Application No. 2021-209770, filed on Dec. 23, 2021. The entire disclosures of Japanese Patent Application Nos. 2021-125929 and 2021-209770 are hereby incorporated herein by reference.

BACKGROUND

Technical Field

The present disclosure generally relates to an operating device for a human-powered vehicle and a human-powered vehicle.

Background Information

Human-powered vehicles often include an operating device. One example of an operating device is disclosed in U.S. Patent Application Publication No. 2021/0155315 (hereinafter referred to as Patent Literature 1). Patent Literature 1 discloses an operating device including an operation unit that is configured to control control-targets provided in a human-powered vehicle.

SUMMARY

The present invention has been made to solve the above problem, and an object of the present invention is to improve convenience of an operating device that is configured to control control-targets provided in a human-powered vehicle.

To solve the above-described problem and achieve the object, an operating device of a human-powered vehicle is provided in accordance with a first aspect according to the present disclosure. The operating device basically comprises a base, an operation member, at least one interface and an electronic controller. The base is at least partly embedded in a vehicle body of the human-powered vehicle. The operation member is provided to the base. The at least one interface is operatively coupled to the operation member. The electronic controller is provided to the base. The electronic controller is electrically connected to the at least one interface. The electronic controller is configured to cause the at least one interface to output a control command to a control-target in accordance with an operation of the operation member. The electronic controller is configured to be capable of changing at least one of the control-target and the control command. The operating device according to the first aspect is capable of changing at least one of a control-target to be controlled in response to an operation of an operation member and a control command output from an interface in response to an operation of the operation member in accordance with taste of a user, so that it is possible to improve the convenience.

In an operating device of a second aspect according to the first aspect, the electronic controller is configured to change at least one of the control-target and the control command in accordance with a predetermined signal that is input via the at least one interface. The operating device according to the second aspect is capable of changing at least one of a control-target and a control command from an outside of an operating device via at least one interface, so that it is possible to improve the convenience.

An operating device of a third aspect according to the second aspect further includes a storage that stores therein information related to the at least one of the control-target and the control command. The electronic controller is configured to rewrite at least a part of the information stored in the storage in accordance with the predetermined signal. The operating device according to the third aspect rewrites at least a part of information stored in a storage to be able to easily change at least one of a control-target and a control command, so that it is possible to further improve the convenience.

In an operating device of a fourth aspect according to the first aspect, the electronic controller is configured to change the at least one of the control-target and the control command, in a state where the operation member is operated by a predetermined operation method. The operating device according to the fourth aspect is capable of easily changing at least one of a control-target and a control command by using an operation member, so that it is possible to further improve the convenience.

In an operating device of a fifth aspect according to any one of the first to fourth aspects, the at least one interface includes a first interface and a second interface, the first interface includes a connector having an electric terminal, and the second interface includes a wireless communication device. The operating device according to the fifth aspect is capable of changing at least one of a control-target and a control command by any of wired communication and wireless communication, so that it is possible to further improve the convenience.

In an operating device of a sixth aspect according to any one of the first to fifth aspects, the control-target includes a motor that is configured to provide a propelling force to the human-powered vehicle, and the control command includes a first control command for controlling the motor. The operating device according to the sixth aspect changes a control-target into a motor to be able to control the motor by using a first control command, so that it is possible to further improve the convenience.

In an operating device of a seventh aspect according to the sixth aspect, the motor is configured to be controlled in any of a plurality of operation states, and the first control command includes a command for selecting one operation state from among the plurality of operation states. The operating device according to the seventh aspect is capable of selecting one operation state from among a plurality of operation states by an operation for an operation member, so that it is possible to further improve the convenience.

An operating device of an eighth aspect according to the seventh aspect further includes a first state display configured to display information related to the one operation state selected from among the plurality of operation states. The operating device according to the eighth aspect is capable of informing a rider of a presently selected operation state by using a first state display, so that it is possible to further improve the convenience.

In an operating device of a ninth aspect according to the eighth aspect, the first state display is configured to: display a plurality of colors; and display a color corresponding to the one operation state selected from among the plurality of operation states. The operating device according to the ninth aspect is capable of informing a rider of a presently selected operation state of a motor by using difference in a color displayed by a first state display, so that it is possible to further improve the convenience.

In an operating device of a tenth aspect according to any one of the first to fifth aspects, the control-target includes a display, and the control command includes a second control command for controlling the display. The operating device according to the tenth aspect changes a control-target into a display to be able to control the display by using a second control command, so that it is possible to further improve the convenience.

In an operating device of an eleventh aspect according to the tenth aspect, the second control command includes a command for switching at least a part of a display screen of the display. The operating device according to the eleventh aspect is capable of, for example, changing a screen of a display, scrolling a screen of the display, or turning ON/OFF of a power source of the display, by using a second control command, so that it is possible to further improve the convenience.

In an operating device of a twelfth aspect according to any one of the first to the aspects, the control-target includes a lighting device, and the control command includes a third control command for controlling the lighting device. The operating device according to the twelfth aspect changes a control-target into a lighting device to be able to control the lighting device by using a third control command, so that it is possible to further improve the convenience.

In an operating device of a thirteenth aspect according to the twelfth aspect, the third control command includes a command for changing an illuminance of the lighting device. The operating device according to the thirteenth aspect is capable of changing an illuminance of a lighting device by using a third control command, so that it is possible to further improve the convenience.

An operating device of a fourteenth aspect according to any one of the first to thirteenth aspects further includes a second state display that is provided to the base and is configured to display information related to a state of a battery provided in the human-powered vehicle. The operating device according to the fourteenth aspect is capable of informing a rider of information related to a present state of a battery by using a second state display, so that it is possible to further improve the convenience.

In an operating device of a fifteenth aspect according to the fourteenth aspect, the second state display includes a plurality of light emitting parts, and the electronic controller is configured to: control the plurality of light emitting parts such that at least one of the plurality of light emitting parts emits light in accordance with a remaining amount of a battery that is provided to the human-powered vehicle; and control the plurality of light emitting parts such that a light amount of each of the at least one light emitting part in a case where a number of the at least one light emitting part is “N” (N is natural number that is equal to or more than one) is larger than a light amount of each of the at least one light emitting part in a case where a number of the at least one light emitting part is “N+1”. The operating device according to the fifteenth aspect causes a controller to control light amounts of light emitting parts even in a case where adjacent light emitting parts are close to each other and the numbers of simultaneously turned-on light emitting parts are different from each other, so that it is possible to reduce change in light amount felt by a user.

An operating device of a sixteenth aspect according to any one of the first to fifteenth aspects includes a power-source switch that is provided to the base, and that is configured to switch between turning ON/OFF of a power source of the control-target. The operating device according to the sixteenth aspect is capable of switching between turning ON/OFF of a power source of a control-target in response to an operation for an operation member, so that it is possible to further improve the convenience.

An operating device of a seventeenth aspect according to any one of the first to sixteenth aspects further includes an engaging part and a fastener attachment part. The engaging part is provided to a first end part of the base in a predetermined direction, and is configured to be engaged with the vehicle body of the human-powered vehicle. The fastener attachment part is provided to a second end part of the base in the predetermined direction and to which a fastener member coupled to the vehicle body of the human-powered vehicle is attached. A fastener member is attached to a fastener attachment part and is coupled to a vehicle body of a human-powered vehicle in a state where an engaging part is engaged with the vehicle body of the human-powered vehicle, so that the operating device according to the seventeenth aspect is able to be stably attached to the vehicle body of the human-powered vehicle.

In an operating device of an eighteenth aspect according to the seventeenth aspect, the operation member is arranged between the engaging part and the fastener attachment part in the predetermined direction. The operating device according to the eighteenth aspect is capable of easily reducing displacement of a base with respect to a vehicle body with the use of load for the base that is generated in response to an operation of an operation member.

A human-powered vehicle of a nineteenth aspect according to the present disclosure includes the operating device according to any one of the first to eighteenth aspects. The human-powered vehicle according to the nineteenth aspect is capable improving the convenience.

An operating device of a human-powered vehicle is provided in accordance with a twentieth aspect according to the present disclosure. The operating device basically comprises a base, an operation member, a plurality of light emitting parts and an electronic controller. The operation member is provided to the base. The plurality of light emitting parts is provided to the base. The electronic controller is configured to: control the plurality of light emitting parts such that at least one of the plurality of light emitting parts emits light in accordance with a remaining amount of a battery that is provided to the human-powered vehicle; and control the plurality of light emitting parts such that a light amount of each of the at least one light emitting part in a case where a number of the at least one light emitting part is “N” (N is natural number that is equal to or more than one) is larger than a light amount of each of the at least one light emitting part in a case where a number of the at least one light emitting part is “N+1”. The operating device according to the twentieth aspect causes an electronic controller to control light amounts of light emitting parts even in a case where adjacent light emitting parts are close to each other and the numbers of simultaneously turned-on light emitting parts are different from each other, so that it is possible to reduce change in light amount felt by a user.

In an operating device of a twenty-first aspect according to one aspect of the fifteen or the twentieth aspect, the plurality of light emitting parts is arranged in a line around the operation member while being spaced from each other. The operating device according to the twenty-first aspect is capable of improving the visibility of a remaining amount of a battery.

According to the present disclosure, it is possible to improve the convenience of an operating device that is configured to control control-targets provided in a human-powered vehicle.

BRIEF DESCRIPTION OF THE DRAWINGS

Referring now to the attached drawings which form a part of this original disclosure.

FIG. 3 is a block diagram illustrating an electric configuration of the human-powered vehicle illustrated in FIG. 1 according to the embodiment.

FIG. 9 is a diagram illustrating one example of an On-Duty of PWM control executed by the light emitting part according to the embodiment.

FIG. 11 is a flowchart illustrating one example of a process to be executed by an electronic controller according to the embodiment.

DETAILED DESCRIPTION OF EMBODIMENTS

Figure 1:
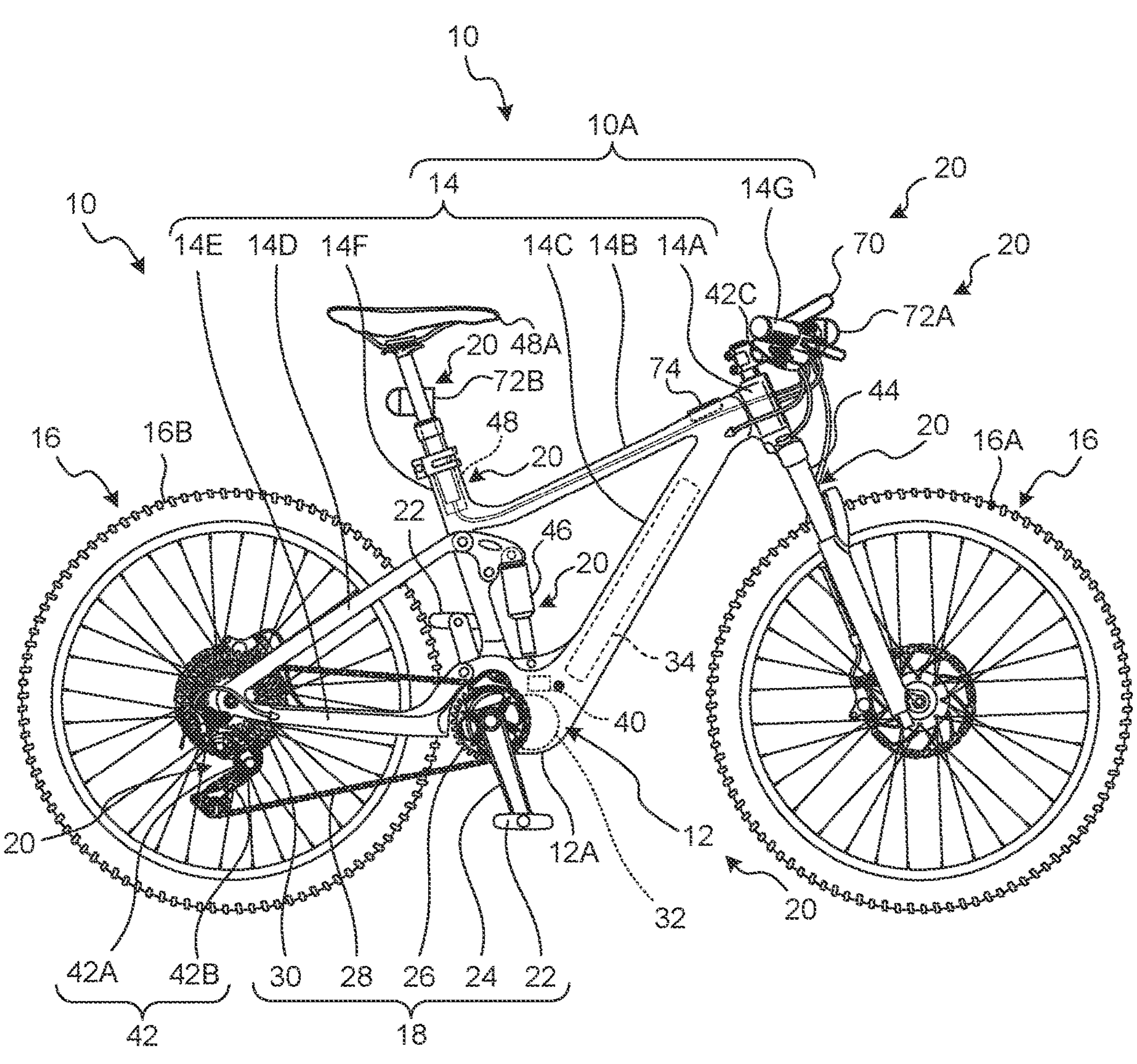
FIG. 1 is a side elevational view illustrating a human-powered vehicle according to an embodiment.

As illustrated in FIG. 1, a human-powered vehicle 10 is a mountain bicycle that includes an electric drive unit 12, for example. The human-powered vehicle 10 is not limited to a mountain bicycle, and can be another-type bicycle such as a road bicycle, a cross bicycle, a city bicycle, a freight bicycle, a hand-cycle, and a recumbent bicycle, or can be a vehicle that includes one or two or more wheels, as long as the vehicle is able to be driven by at least human power and includes the electric drive unit 12.

The human-powered vehicle 10 includes a vehicle body 10A. The vehicle body 10A includes a frame 14 and a handlebar 14G. The frame 14 includes a head tube 14A, a top tube 14B, a down tube 14C, a seat stay 14D, a chain stay 14E, and a seat tube 14F, for example. The head tube 14A, the top tube 14B, the down tube 14C, and the seat tube 14F constitute a front frame. The seat stay 14D and the chain stay 14E constitute a rear frame.

The human-powered vehicle 10 includes at least one wheel 16, a drive train 18, and a plurality of control-targets 20. In the present embodiment, the at least one wheel 16 includes a front wheel 16A and a rear wheel 16B. In the present embodiment, the electric drive unit 12 includes a part of the drive train 18.

The drive train 18 is configured to transmit human-power driving force to a drive wheel. In the present embodiment, the rear wheel 16B is the drive wheel. The drive train 18 includes a chain 28. The drive train 18 further includes a pair of pedals 22, a crank 24, a front chain wheel 26, and a rear sprocket 30. A first one-way clutch is arranged between the front chain wheel 26 and the crank 24, for example. In a case where the crank 24 rotates in a first rotational direction, the first one-way clutch transmits rotational force from the crank 24 to the front chain wheel 26, and in a case where the crank 24 rotates in a second rotational direction, the first one-way clutch tolerates relative rotation between the crank 24 and the front chain wheel 26. The first one-way clutch can be omitted. A human-power driving force applied to the pedals 22 is transmitted to the rear wheel 16B via the crank 24, the front chain wheel 26, the chain 28, and the rear sprocket 30. In the present embodiment, the rear sprocket 30 includes a plurality of sprockets. The rear sprocket 30 includes two or more sprockets whose numbers of teeth are different from each other, for example.

The drive train 18 can include pullies and a belt, or can include bevel gears and a shaft instead of the front chain wheel 26, the rear sprockets 30, and the chain 28. The crank 24 includes a crank shaft, a first crank arm that is coupled to a first end part of the crank shaft in an axial direction, and a second crank arm that is coupled to a second end part of the crank shaft in the axial direction. The drive train 18 can have any configuration as long as the drive train 18 is configured to transmit human-power driving force to a drive wheel. The front chain wheel 26 can include a plurality of chain wheels. For example, a rotational axis of the front chain wheel 26 is coaxially arranged with respect to a rotational axis of the crank 24. A rotational shaft of the rear sprockets 30 is coaxially arranged with respect to a rotational shaft of the rear wheel 16B.

The electric drive unit 12 is configured to provide propelling force to the human-powered vehicle 10. The electric drive unit 12 operates in accordance with human-power driving force applied to the pedals 22, for example. The electric drive unit 12 includes a motor 32. The electric drive unit 12 includes a housing 12A. In the present embodiment, the electric drive unit 12 further includes a crank shaft and a drive-unit output shaft with which the front chain wheel 26 is connected. A rotational axis of the drive-unit output shaft is coaxially arranged with respect to a rotational axis of the crank 24. The drive-unit output shaft is connected to the crank shaft via a first one-way clutch. The motor 32 is provided in the housing 12A. The motor 32 includes an electric motor.

The motor 32 includes a brushless motor, for example. The motor 32 is configured to be driven in a state where a drive wheel is rotated by human-power driving force so as to assist rotation of the drive wheel by the human-power driving force. Preferably, the electric drive unit 12 further includes a reducer. A rotational shaft of the motor 32 is connected to the drive-unit output shaft via the reducer. The motor 32 operates by using electric power supplied from a battery 34. The battery 34 is housed in the down tube 14C, for example. The electric drive unit 12 can be included in the wheel 16. The electric drive unit 12 can have any configuration as long as the electric drive unit 12 is capable of driving the wheel 16 directly or indirectly.

The human-powered vehicle 10 includes a control device 40 of a human-powered vehicle. In the present embodiment, the control device 40 is configured to control the motor 32. In another mode, it may be possible that the control device 40 does not control the motor 32. The control device 40 adjusts a drive current and a driving voltage to be supplied to the motor 32 so as to control an assistance force for propelling the human-powered vehicle 10. The control device 40 can be included in the electric drive unit 12. The control device 40 is housed in the housing 12A of the electric drive unit 12, for example. It may be possible that the control device 40 is not included in the electric drive unit 12, and is included in the frame 14 of the human-powered vehicle 10. The control device 40 operates by using electric power that is supplied from the battery 34.

The control-targets 20 include a transmission 42. The control-targets 20 include at least one of a front suspension 44 and a rear suspension 46. The control-targets 20 include a seatpost 48. The control-targets 20 include a chain guide 42B that is rotatable around a predetermined rotational axis. The chain guide 42B is configured to guide the chain 28. The control-targets 20 include the motor 32 that is configured to provide a propelling force to the human-powered vehicle 10. The control-targets 20 include a display 70. The control-targets 20 include a pair of lighting devices 72A and 72B.

The transmission 42 is arranged on a transmission path of a human-power driving force. The transmission path of the human-power driving force is a route from the pedals 22 to a drive wheel. In the present embodiment, the transmission 42 includes an external-mounted transmission. The transmission 42 includes a derailleur 42A, for example. In the present embodiment, the derailleur 42A includes a rear derailleur. The derailleur 42A can include a front derailleur. The transmission 42 further includes the front chain wheel 26 and the rear sprockets 30. In a case where the derailleur 42A includes a rear derailleur, the rear sprockets 30 include a plurality of sprockets. In a case where the derailleur 42A includes a front derailleur, the front chain wheel 26 includes a plurality of chain wheels. In a case where the derailleur 42A includes a rear derailleur, the derailleur 42A moves the chain 28 from one to another of a plurality of sprockets to cause the transmission 42 to execute speed changing.

In a case where the derailleur 42A includes a front derailleur, the derailleur 42A moves the chain 28 from one to another of a plurality of chain wheels to cause the transmission 42 to execute speed changing. The transmission 42 executes speed changing, thereby resulting in a change in a transmission ratio of the transmission 42. In a state where a driving force is being transmitted from an input part of the transmission 42 to an output part of the transmission 42, a transmission ratio of the transmission 42 is a ratio of a rotational speed of the output part of the transmission 42 to a rotational speed of the input part of the transmission 42. In a case where a rotational speed of the input part of the transmission 42 is defined as Vi, a rotational speed of the output part of the transmission 42 is defined as Vo, and a transmission ratio is defined as R, where the term R is indicated by formula 1. In the present embodiment, the term Vi corresponds to a rotational speed of the crank 24, and the term Vo corresponds to a rotational speed of the drive wheel.

$$R=Vo/Vi \quad \text{(Formula 1)}$$

The transmission 42 can include an internal-mounted transmission instead of the external-mounted transmission, and can include an internal-mounted transmission in addition to the external-mounted transmission. The internal-mounted transmission is arranged in a hub of the drive wheel, for example. The internal-mounted transmission can be a geared transmission or a gearless transmission. As indicated in FIG. 3, the transmission 42 includes a transmission state detecting device 42*a* that outputs information related to the present transmission ratio. The information related to the present transmission ratio corresponds to information related to the present transmission stage. In a case where the transmission 42 includes the derailleur 42A, the transmission state detecting device 42*a* outputs a signal according to a position of the derailleur 42A. The transmission state detecting device 42*a* can be configured to output a signal according to a position of a member included in a first electric actuator 42D. The transmission state detecting device 42*a* is electrically connected to an electronic controller 52, which hereinafter will be referred to as the controller 52 for the sake of simplicity.

In the present embodiment, the control device 40 is configured to control the transmission 42. In another mode, the control device 40 can be arranged in the transmission 42. The control device 40 includes a manual transmission mode and an automatic transmission mode as transmission modes of the transmission 42. The control device 40 is configured to change a transmission ratio of the transmission 42 by the manual transmission mode and the automatic transmission mode. The transmission mode is changed by a rider. For example, the transmission mode can be switched if a transmission operating device 42C is operated by a predetermined operation method, or can be switched if an operating device other than the transmission operating device 42C is operated. The transmission operating device other than the transmission operating device 42C is connected to the control device 40 via an electric cable or a wireless communication device. The transmission operating device other than the transmission operating device 42C includes a cyclocomputer, a smartphone, or a tablet computer, for example.

The transmission 42 includes the first electric actuator 42D. The first electric actuator 42D includes an electric motor. The first electric actuator 42D can include an electric motor and a reducer connected with the electric motor. In the present embodiment, the first electric actuator 42D can be arranged in the derailleur 42A, or can be arranged separately from the derailleur 42A to be connected to the derailleur 42A with the use of a Bowden cable. In a case where the transmission 42 includes an internal-mounted transmission, the first electric actuator 42D can be arranged in an internal-mounted transmission, or can be arranged separately from the internal-mounted transmission to be connected to the derailleur 42A with the use of a Bowden cable.

In a case where a transmission mode is a manual transmission mode, the control device 40 drives the first electric actuator 42D in accordance with operation of the transmission operating device 42C, and further drives at least one of the derailleur 42A and an internal-mounted transmission by using a driving force of the first electric actuator 42D, for example. Electric power is supplied to the first electric actuator 42D from the battery 34. Electric power can be supplied to the transmission 42 from a battery dedicated to the transmission 42.

In a case where a transmission mode is an automatic transmission mode, the control device 40 drives the first electric actuator 42D in accordance with a traveling state of the human-powered vehicle 10, and further drives at least one of the derailleur 42A and an internal-mounted transmission by using a driving force of the first electric actuator 42D. The traveling state of the human-powered vehicle 10 includes at least one of a cadence of the crank 24, a vehicle speed of the human-powered vehicle 10, and a human-power driving force. The cadence is the rotation number per minute of the rotating crank 24, for example. The control device 40 controls the transmission 42 such that the cadence is kept within a predetermined range, for example. In a case where a cadence is changed from a value within the predetermined range to a value that is smaller than a lower-limit value of the predetermined range, the control device 40 controls the transmission 42 such that a transmission ratio of the transmission 42 reduces. In a case where a cadence is changed from a value within the predetermined range to a value that is greater than an upper-limit value of the predetermined range, the control device 40 controls the transmission 42 such that a transmission ratio of the transmission 42 increases. The control device 40 can control the transmission 42 in accordance with a human-power driving force working on the drive train 18 of the human-powered vehicle 10, for example.

The front suspension 44 supports a hub of the front wheel 16A to be rotatable. The front suspension 44 includes a shock absorber that expands and contracts in a longitudinal direction thereof. The front suspension 44 is configured to attenuate an impact transmitted from a road surface to the front wheel 16A by using the shock absorber. The front suspension 44 is controlled by the control device 40.

The control device 40 is configured to change at least one of an initial length of the front suspension 44, a stroke amount of the front suspension 44, and hardness of the front suspension 44. The front suspension 44 includes a second electric actuator 44*a*. The second electric actuator 44*a* includes at least one electric motor or at least one solenoid. The control device 40 controls the second electric actuator 44*a*. Electric power is supplied to the second electric actuator 44*a* from the battery 34. A stroke amount of the front suspension 44 is a length in which the shock absorber is capable of expanding and contracting. Hardness of the front suspension 44 is attenuation force of the shock absorber. A configuration of the front suspension 44 is a general structure, and thus explanation thereof is omitted.

The second electric actuator 44*a* is directly or indirectly connected to a control valve provided in the front suspension 44. The second electric actuator 44*a* can be connected to a control valve of the front suspension 44 via a cable. The front suspension 44 includes a first sensor that outputs information related to an initial length of the front suspension 44 and a second sensor that outputs information related to a hardness of the front suspension 44. The first sensor and the second sensor are electrically connected to the controller 52. The first sensor and the second sensor can be configured to output signals according to a state of a control valve, or can be configured to output signals according to a state of the second electric actuator 44*a*. The first sensor and the second sensor include a magnetic sensor, a potentiometer, or an optical sensor among other things, for example.

A first end part of the rear suspension 46 in an expanding-and-contracting direction thereof is connected with a front frame, and a second end part of the rear suspension 46 in the expanding-and-contracting direction is connected with a rear frame. The front frame and the rear frame are configured to be rotatable around respective predetermined rotational axes. The rear frame forms a swing arm. The rear suspension 46 includes a shock absorber that expands and contracts in a longitudinal direction thereof. The rear suspension 46 is configured to attenuate an impact transmitted from a road surface to the rear wheel 16B by using the shock absorber. The rear suspension 46 operates by electric power supplied from the battery 34. The rear suspension 46 is controlled by the control device 40.

The control device 40 is configured to change at least one of an initial length of the rear suspension 46, a stroke amount of the rear suspension 46, and hardness of the rear suspension 46. The rear suspension 46 includes a third electric actuator 46*a*. The third electric actuator 46*a* includes at least one electric motor or at least one solenoid. The control device 40 controls the third electric actuator 46*a*. Electric power is supplied to the third electric actuator 46*a* from the battery 34. A stroke amount of the rear suspension 46 is a length in which the shock absorber is capable of expanding and contracting. Hardness of the rear suspension 46 is attenuation force of the shock absorber. A configuration of the rear suspension 46 is a general structure, and thus explanation thereof is omitted.

The third electric actuator 46*a* is directly or indirectly connected to a control valve provided in the front suspension 44. The third electric actuator 46*a* can be connected to a control valve of the rear suspension 46 via a cable. The rear suspension 46 includes a third sensor that outputs information related to an initial length of the rear suspension 46 and a fourth sensor that outputs information related to a hardness of the rear suspension 46. The third sensor and the fourth sensor are electrically connected to the controller 52. The third sensor and the fourth sensor can be configured to output signals according to a state of a control valve, or can be configured to output signals according to a state of the third electric actuator 46*a*. The third sensor and the fourth sensor include a magnetic sensor, a potentiometer, or an optical sensor among other things, for example.

The seatpost 48 is attached to the seat tube 14F. A saddle 48A is attached to the seatpost 48. The seatpost 48 is configured to adjust a height from a road surface to the saddle 48A if a length of a part protruding from the seat tube 14F is changed. The seatpost 48 operates by electric power supplied from the battery 34. The seatpost 48 is controlled by the control device 40. The seatpost 48 includes a fourth electric actuator 48*a*. The fourth electric actuator 48*a* includes at least one electric motor or at least one solenoid. The control device 40 controls a length of the seatpost 48 by the fourth electric actuator 48*a*. Electric power is supplied from the battery 34 to the fourth electric actuator 48*a*. The seatpost 48 includes a dropper or an adjustable seat-post. Configurations of the dropper and the adjustable seat-post are general structures, and thus explanation thereof is omitted.

The fourth electric actuator 48*a* is directly or indirectly connected to a control valve provided in the seatpost 48, for example. The fourth electric actuator 48*a* can be connected to a control valve of the seatpost 48 via a cable. In a state where the control valve is opened, the seatpost 48 extends by hydraulic pressure, and if a control valve is closed, a length thereof is kept, for example. The fourth electric actuator 48*a* can be configured to expand and contract by a driving force of the fourth electric actuator 48*a* instead of the control of the control valve. The seatpost 48 includes a fifth sensor that outputs information related to a length of the seatpost 48. The fifth sensor is electrically connected to the controller 52. The fifth sensor can be configured to output a signal according to a state of the control valve, or can output a signal according to a state of the fourth electric actuator 48*a*. The fifth sensor includes a magnetic sensor, a potentiometer, or an optical sensor among other things, for example.

The chain guide 42B is included in the derailleur 42A. The chain guide 42B includes a resistance member. The resistance member provides a rotational resistance around a predetermined rotational axis with respect to the chain guide 42B rotating around the rotational axis. The resistance member includes an electric motor, a hydraulic damper, or a friction plate, for example. Electric power is supplied from the battery 34 to the chain guide 42B. The chain guide 42B is controlled by the control device 40. The control device 40 controls the chain guide 42B in accordance with a total driving force including a human-power driving force working on the drive train 18 of the human-powered vehicle 10 and an assistance force by the motor 32.

A structure of the chain guide 42B is disclosed in, for example, U.S. Pat. Nos. 8,202,182, 9,377,089, and the like, and thus explanation thereof is omitted. The control device 40 controls a resistance member so as to change a rotational resistance of the chain guide 42B around a predetermined rotational axis. The chain guide 42B includes a sixth sensor that outputs information related to a rotational resistance of the chain guide 42B. The sixth sensor is electrically connected to the controller 52. The sixth sensor can be configured to output a signal according to a state of the rotational resistance of the chain guide 42B.

Figure 2:
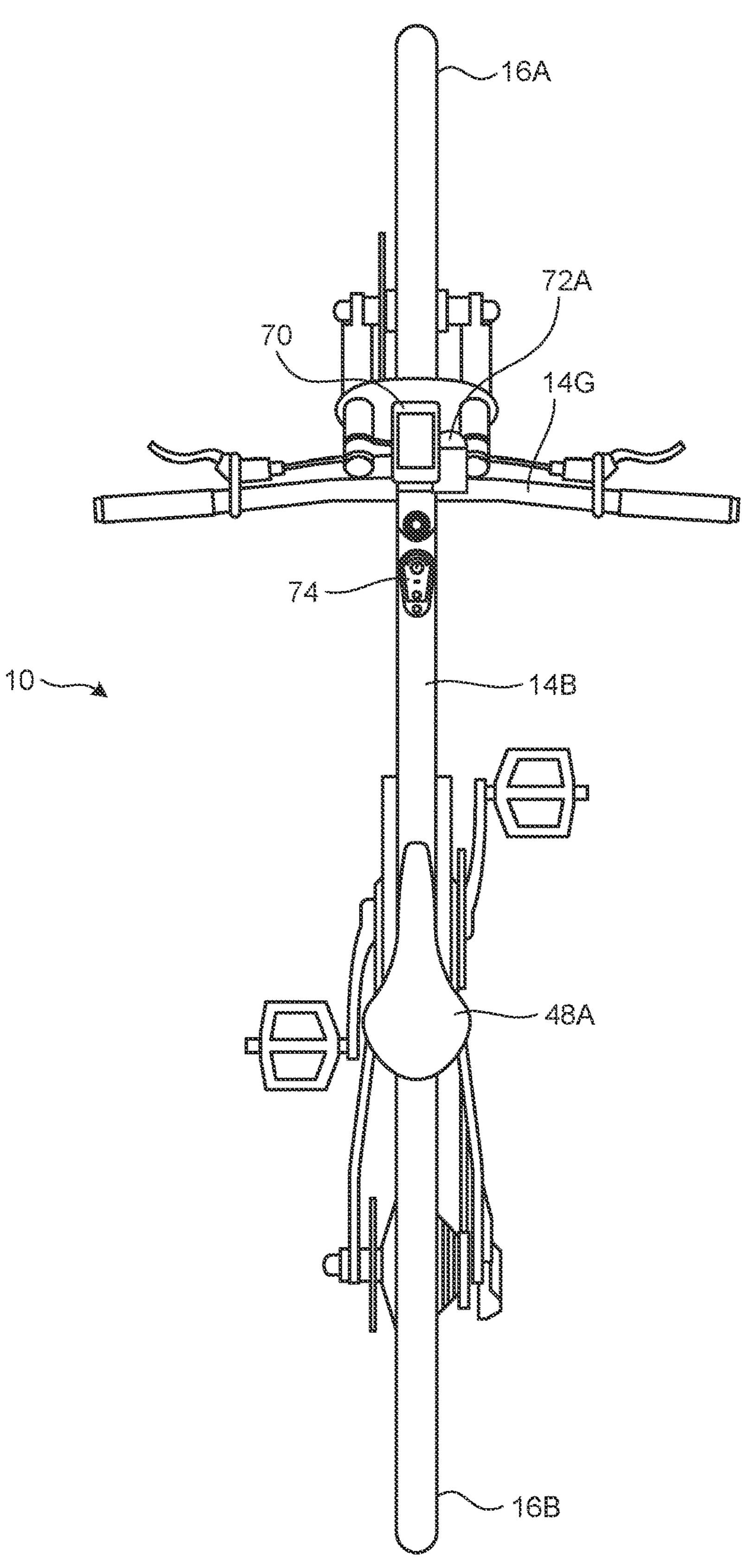
FIG. 2 is a top view illustrating the human-powered vehicle illustrated in FIG. 1 according to the embodiment.

As illustrated in FIG. 2, the display 70 is arranged at a center position in a longitudinal direction of the handlebar 14G. The display 70 can be arranged at a position other than the center position in the longitudinal direction of the handlebar 14G. The display 70 can be attached to a stem that connects the handlebar 14G and the frame 14 with each other. The display 70 is operated by electric power of a built-in battery. The display 70 can be configured to be operated by electric power that is supplied from the battery 34. The display 70 is connected to the control device 40 to be able to communicate with each other. The display 70 can be connected to the control device 40 via an electric cable or can be connected thereto via a wireless communication device.

The display 70 includes a display panel. The display panel is, for example, a liquid crystal display panel, or an organic electroluminescence (organic EL) panel. The display 70 displays, on the display panel, at least one piece of information related to a state of the human-powered vehicle 10. The display 70 is configured to display power or torque applied to the crank 24 from a rider in response to a signal that is output from a human-power driving force detecting unit 60. The display 70 is configured to display a vehicle speed of the human-powered vehicle 10 in response to a signal that is output or received from a vehicle-speed sensor 62. The display 70 is configured to display a cadence of the crank 24 in response to a signal that is output from a crank rotation sensor 64. The display 70 is configured to display an acceleration of the human-powered vehicle 10 in response to a signal that is output from an acceleration sensor 66.

The display 70 is configured to display information indicating a state of the transmission 42 in accordance with a signal that is output from the transmission 42. The display 70 is configured to display information indicating a state of the front suspension 44 in accordance with a signal that is output from the front suspension 44. The display 70 is configured to display information indicating a state of the rear suspension 46 in accordance with a signal that is output from the rear suspension 46. The display 70 is configured to display information indicating a state of the seatpost 48 in accordance with a signal that is output from the seatpost 48. The display 70 is configured to display information indicating a state of the electric drive unit 12 in accordance with a signal that is output from the electric drive unit 12. The display 70 can include, for example, a cyclocomputer, a smartphone, a tablet computer, or the like.

The lighting device 72A is attached to the handlebar 14G, for example. The lighting device 72A can be attached to the front suspension 44 or a stem. The lighting device 72A is a head light. The lighting device 72A emits light by electric power of a built-in battery. The lighting device 72A can be configured to emit light by using electric power that is supplied from the battery 34. The lighting device 72B is attached to the seatpost 48, for example. The lighting device 72B is a taillight. The lighting device 72B emits light by using electric power of a built-in battery. The lighting device 72A can be configured to emit light by using electric power that is supplied from the battery 34.

An operating device 74 of the human-powered vehicle 10 includes an operation member 80 and a base 76. The operation member 80 is provided to the base 76. Here, for example, the base 76 is configured such that a part of the base 76 is embedded in the vehicle body 10A of the human-powered vehicle 10. Here, for example, the operating device 74 includes at least one interface 94, and an electronic controller 96, which hereinafter will be referred to as the controller 96 for the sake of simplicity. The controller 96 is provided to the base 76 to be electrically connected to the at least one interface 94. The controller 96 is configured to cause the at least one interface 94 to output a control command to the control-targets 20 in response to operation of the operation member 80. Here, the operation member 80 is a user operable input. The controller 96 is configured to be able to change at least one of the control-target 20 and a control command.

As illustrated in FIGS. 1 and 2, the operating device 74 is embedded in the top tube 14B of the frame 14, for example. Preferably, the operating device 74 is arranged in a position of the top tube 14B which is closer to the handlebar 14G than a saddle 48A. The base 76 of the operating device 74 is embedded in the top tube 14B such that the operation member 80 is exposed from the top tube 14B, for example. The operation member 80 is arranged at an upper end part of the top tube 14B. The operating device 74 operates by using electric power supplied from the battery 34. The operating device 74 can be arranged in a position other than the top tube 14B as long as it is able to be operated by a rider. For example, the operating device 74 can be arranged in the handlebar 14G, the down tube 14C, the seat tube 14F, or the like.

As illustrated in FIG. 3, the control device 40 includes a storage 50 in addition to the controller 52. The storage 50 includes any computer storage device or any non-transitory computer-readable medium with the sole exception of a transitory, propagating signal. The storage 50 includes a storage such as a non-volatile memory and a volatile memory. The non-volatile memory includes at least one of a Read Only Memory (ROM), a flash memory, and a hard disk, for example. The volatile memory includes a Random Access Memory (RAM), for example. The storage 50 stores therein software for controlling the control-targets 20.

The controller 52 includes at least one calculation device such as a Central Processing Unit (CPU) and a Micro Processing Unit (MPU) that includes at least one processor. Thus, the terms “electronic controller” and “controller” as used herein refers to hardware that executes a software program, and does not include a human being. The controller 52 is configured such that the at least one calculation device execute a control program stored in the ROM by using the RAM as a work region, for example, so as to control operation of the control-targets 20. In a case where the controller 52 includes two or more calculation processing devices (processors), the two or more calculation processing devices (processors) can be arranged at positions that are separate from each other, for example, one of the two or more calculation processing devices (processors) can be configured to communicate with another calculation processing device via a wireless communication device, or can be configured to communicate with another calculation processing device via the Internet.

The human-powered vehicle 10 includes the human-power driving force detecting unit 60, the vehicle-speed sensor 62, the crank rotation sensor 64, and the acceleration sensor 66. The controller 52 is connected to the human-power driving force detecting unit 60, the vehicle-speed sensor 62, the crank rotation sensor 64, the acceleration sensor 66, the transmission operating device 42C, a setting operating device 68, and the operating device 74 via at least one of an electric cable and a wireless communication device. The controller 52 is connected to the battery 34 via an electric cable. The human-power driving force detecting unit 60, the crank rotation sensor 64, and the acceleration sensor 66 can be included in the electric drive unit 12.

Preferably, the controller 52 includes a first interface 52A. The first interface 52A is configured to input information that is detected by the human-power driving force detecting unit 60. Preferably, the controller 52 includes a second interface 52B. The second interface 52B is configured to input information that is detected by the vehicle-speed sensor 62. Preferably, the controller 52 includes a third interface 52C. The third interface 52C is configured to input information that is detected by the crank rotation sensor 64. Preferably, the controller 52 includes a fourth interface 52D. The fourth interface 52D is configured to input information that is detected by the acceleration sensor 66. Preferably, the controller 52 includes a fifth interface 52E. The fifth interface 52E is configured to input information a speed changing command that is transmitted from the transmission operating device 42C. Preferably, the controller 52 includes a sixth interface 52F. The sixth interface 52F is configured to input a setting command that is transmitted from the setting operating device 68. Preferably, the controller 52 includes a seventh interface 52G. The seventh interface 52G is configured to receive a control command transmitted from the operating device 74.

Each of the first to sixth interfaces 52A, 52B, 52C, 52D, 52E, 52F, and 52G includes at least one of a cable connecting port and a wireless communication device, for example. The wireless communication device includes a short-range distance wireless communication unit, for example. The short-range distance wireless communication unit is configured to execute wireless communication on the basis of a wireless communication standard such as Bluetooth (Registered Trademark) and ANT+, or an original wireless communication standard. In a case where an electric cable is connected with each of the first to sixth interfaces 52A, 52B, 52C, 52D, 52E, 52F and 52G, a corresponding cable connecting port can be omitted and the corresponding electric cable can be fixed thereto.

The human-power driving force detecting unit 60 is configured to output information related to a human-power driving force to the controller 52. For example, the human-power driving force detecting unit 60 is configured to output a signal according to a human-power driving force applied to the crank 24. The human-power driving force detecting unit 60 is arranged on a transmission path of the human-power driving force between a rotational shaft of the crank 24 to the front chain wheel 26. The human-power driving force detecting unit 60 can be arranged on the rotational shaft of the crank 24 or the front chain wheel 26. The human-power driving force detecting unit 60 can be arranged on the crank 24 or the pedal 22. The human-power driving force detecting unit 60 can be realized with the use of, for example, a strain sensor, a magnetostrictive sensor, an optical sensor, and a pressure sensor among other things. It is sufficient that the human-power driving force detecting unit 60 is a sensor configured to output a signal according to a human-power driving force applied to the crank 24 or the pedal 22.

The vehicle-speed sensor 62 is configured to output information related to a speed of the human-powered vehicle 10 to the controller 52. The vehicle-speed sensor 62 is configured to output a signal according to a rotational speed of the wheel 16. The vehicle-speed sensor 62 is arranged on the chain stay 14E of the human-powered vehicle 10, for example. The vehicle-speed sensor 62 includes a magnetic sensor. The vehicle-speed sensor 62 is configured to detect a magnetic field of at least one magnet attached to a spoke, a disk brake rotor, or a hub of the wheel 16. The vehicle-speed sensor 62 is configured to output a signal if detecting a magnetic field, for example. The controller 52 is configured to calculate a traveling speed of the human-powered vehicle 10 on the basis of information related to a time interval between signals or a width of a signal output from the vehicle-speed sensor 62 in accordance with rotation of the wheel 16 and a circumference length of the wheel 16, for example. As long as the vehicle-speed sensor 62 is configured to output information related to a speed of the human-powered vehicle 10, the vehicle-speed sensor 62 can include, but not limited to, a magnetic sensor, another sensor such as an optical sensor, an acceleration sensor, and a GPS reception device.

The crank rotation sensor 64 is configured to output information according to a rotational state of the crank 24 to the controller 52. For example, the crank rotation sensor 64 is configured to output a signal according to a rotational angle of the crank 24. The crank rotation sensor 64 is configured to include a magnetic sensor that outputs a signal according to intensity of a magnetic field. A circular magnet whose intensity of a magnetic field changes along a circumferential direction thereof is arranged on a rotational shaft of the crank 24, a member that rotates integrally with the rotational shaft of the crank 24, or a power transmitting path from the rotational shaft of the crank 24 to the front chain wheel 26. The member that rotates integrally with the rotational shaft of the crank 24 can include an output shaft of the motor 32. For example, in a case where a one-way clutch is not provided between the crank 24 and the front chain wheel 26, the magnet can be arranged in the front chain wheel 26. The crank rotation sensor 64 can include an optical sensor instead of the magnetic sensor. The controller 52 is capable of calculating a rotational speed of the crank 24 on the basis of a change amount per unit time of a rotational angle of the crank 24.

The acceleration sensor 66 is configured to output information related to an acceleration in an advancing direction of the human-powered vehicle 10 to the controller 52. The operating device 74 is configured to output a control command according to operation performed by a rider to the controller 52 so as to control the control-targets 20. The operating device 74 displays information related to a state of the control-target 20 which is input from the controller 52. For example, the operating device 74 displays information related to an assist mode of the motor 32, which will be mentioned later. The operating device 74 displays information related to a remaining amount of the battery 34 which is input from the battery 34.

The controller 52 is electrically connected to the control-targets 20. Preferably, the controller 52 further includes an inverter circuit that is electrically connected to the motor 32. The inverter circuit can be separately arranged from the controller 52 while not being included in the controller 52.

The controller 52 is connected to the control-targets 20 by an electric cable or a wireless communication device to be able to communicate with each other.

The controller 52 is configured to control the motor 32 by a plurality of operation states whose maximum values of assistance force by the motor 32 are different from each other. Preferably, the motor 32 is configured to be controlled in any of a plurality of operation states. The controller 52 has a first assist mode, a second assist mode, and a third assist mode as the plurality of operation states whose maximum values of assistance force by the motor 32 are different from each other, for example. The maximum value of assistance force in the first assist mode is greater than the maximum value of assistance force in the second assist mode. The maximum value of assistance force in the second assist mode is greater than the maximum value of assistance force in the third assist mode.

If a rider operates the setting operating device 68, the first to third assist modes are set. The setting operating device 68 is attached to the handlebar 14G of the human-powered vehicle 10, for example. As long as being able to be operated by a rider of the human-powered vehicle 10, the setting operating device 68 can be arranged at an arbitrary position of the human-powered vehicle 10 such as the top tube 14B. The setting operating device 68 includes an electric switch to be operated by a hand of a user, for example. The setting operating device 68 is connected to the control device 40 via an electric cable or a wireless communication device.

Figure 4:
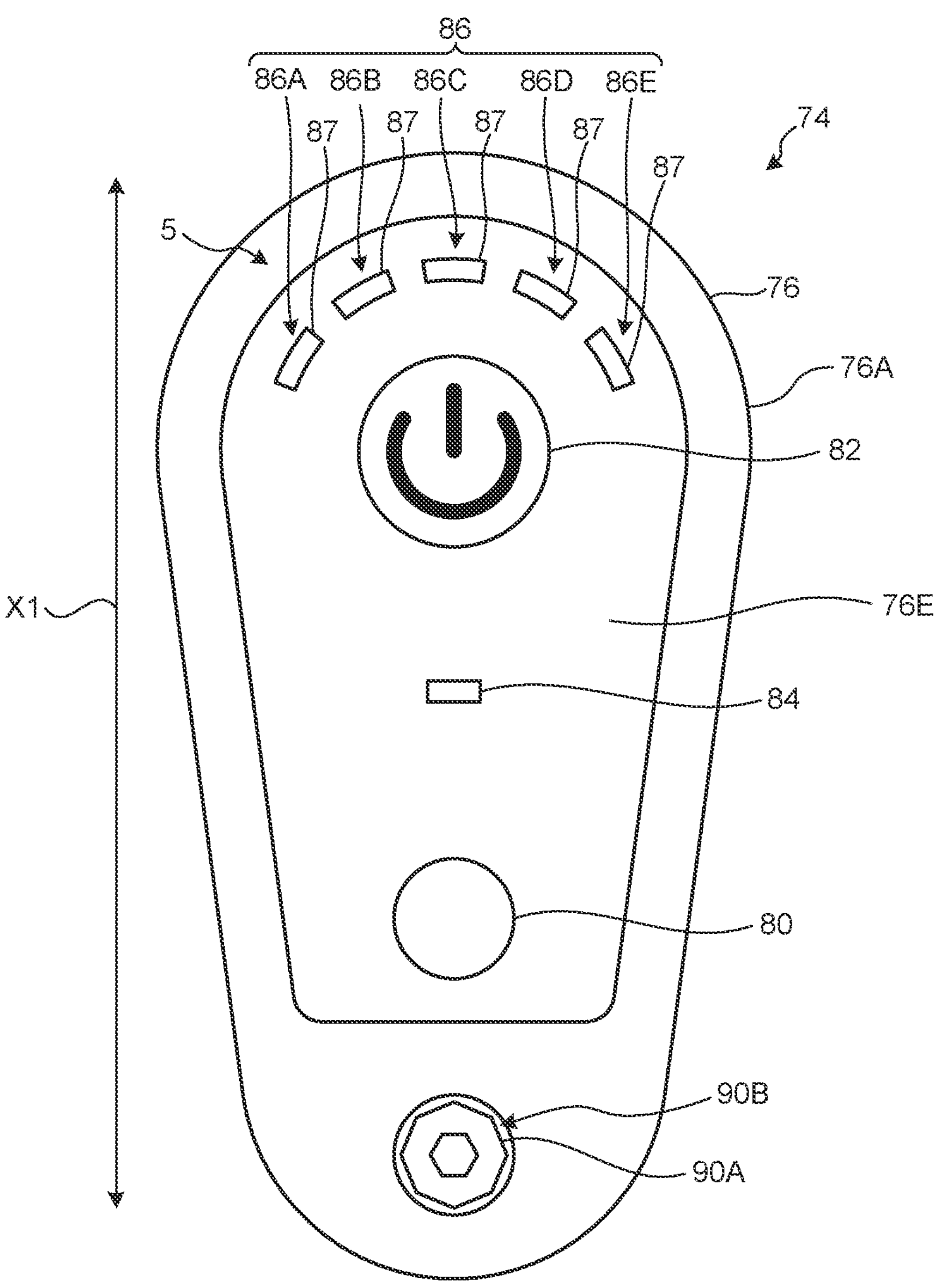
FIG. 4 is a top view illustrating an operating device of the human-powered vehicle illustrated in FIG. 1 according to the embodiment.
Figure 5:
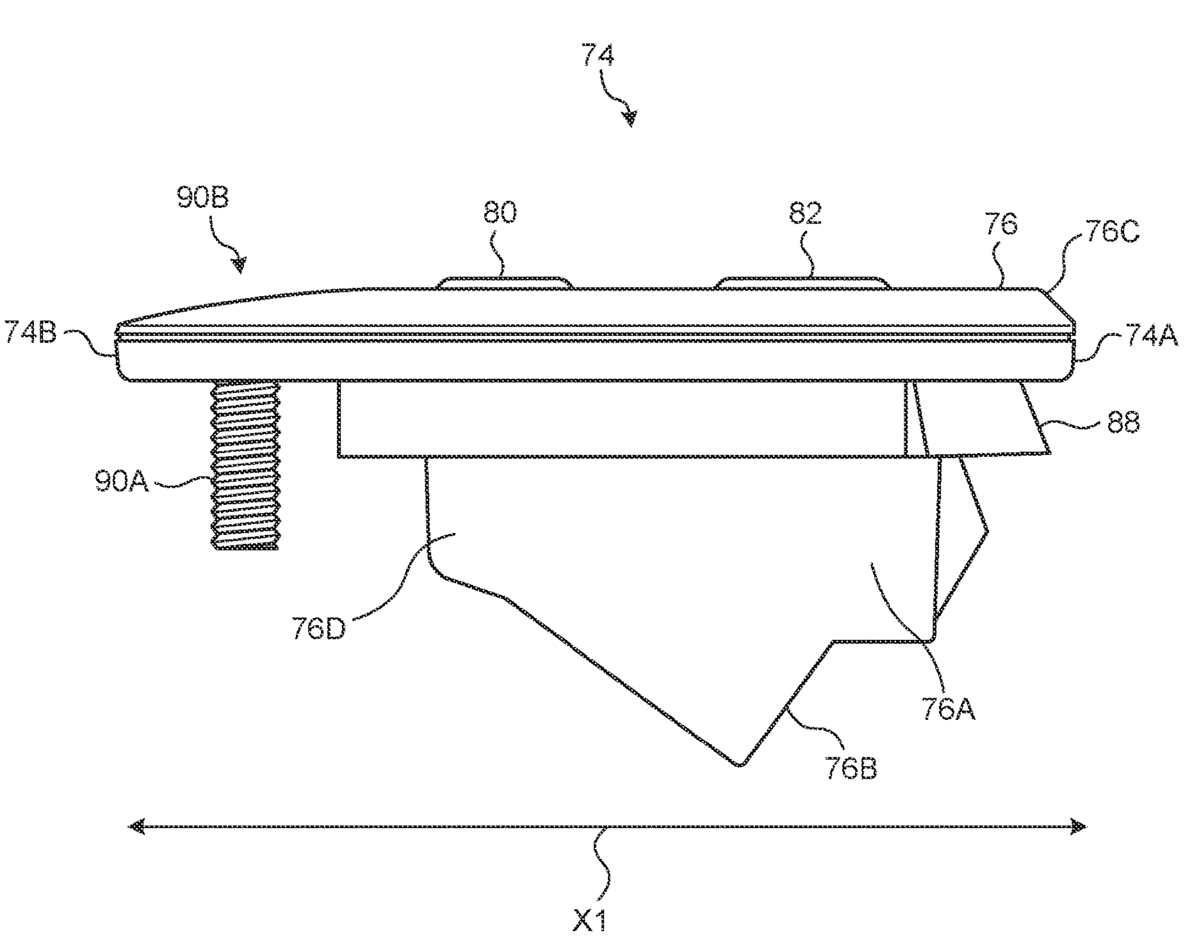
FIG. 5 is a side elevational view illustrating the operating device of the human-powered vehicle illustrated in FIG. 4 according to the embodiment.

As illustrated in FIGS. 4 and 5, the operating device 74 includes the base 76. The base 76 includes a chassis 76A that houses therein the controller 96. At least a part of an interface 94 can be housed in the chassis 76A. An opening 76B is formed in the chassis 76A, and an electric terminal 94C of the interface 94 is exposed from the opening 76B. Preferably, the operating device 74 includes an engaging part 88. The engaging part 88 is arranged in a first end part 74A of the base 76 in a predetermined direction $X^1$, and is configured to engage with the vehicle body 10A of the human-powered vehicle 10.

Preferably, the operating device 74 further includes a fastener attachment part 90B. The fastener attachment part 90B is arranged in a second end part 74B of the base 76 in the predetermined direction X1, and a fastener member 90A is attached thereto which is coupled to the vehicle body 10A of the human-powered vehicle 10. The predetermined direction X1 is parallel to a longitudinal direction of the top tube 14B in a state where the operating device 74 is attached to the top tube 14B. Shapes of the engaging part 88 and the fastener attachment part 90B are not limited, and can have other shapes as long as they fix the operating device 74 to the vehicle body 10A.

In a state where being attached to the vehicle body 10A, the base 76 includes a first part 76C that is arranged outside of the vehicle body 10A, and a second part 76D that is arranged inside of the vehicle body 10A. For example, an internal space of the vehicle body 10A includes an internal space of the frame 14, an internal space of the handlebar 14G, an internal space of a stem, and the like. The engaging part 88 is constituted of an elastic member made of rubber, for example. The engaging part 88 is arranged in the second part 76D. The engaging part 88 is formed in the vehicle body 10A, and is configured to be in contact with an inner peripheral surface that defines an opening into which the second part 76D is inserted. The engaging part 88 has a tapered shape in which a protruding width in a direction from the second end part 74B to the first end part 74A of the base 76 reduces as a position goes towards the first part 76C. The engaging part 88 functions as a retaining member of the base 76 from the vehicle body 10A after being attached to the vehicle body 10A of the human-powered vehicle 10.

A through hole is formed in the fastener attachment part 90B, which penetrates the first part 76C. The fastener member 90A is a bolt, for example. A head portion of the bolt includes a tool engaging part with which a tool such as a hexagonal wrench and Torx® is engaged. A screw hole is formed in the top tube 14B of the human-powered vehicle 10, which is to be connected with the fastener member 90A. In a state where the engaging part 88 is engaged with the human-powered vehicle 10, the base 76 is fixed to the top tube 14B of the human-powered vehicle 10 by the fastener member 90A that is inserted into the through hole of the fastener attachment part 90B.

The operating device 74 includes the operation member 80 as mentioned above. The operation member 80 is arranged between the engaging part 88 and the fastener attachment part 90B in the predetermined direction X1. The first part 76C of the base 76 includes an operation member mounted surface 76E on which at least a part of the operation member 80 is arranged. The operation member mounted surface 76E is substantially along an outer surface of the vehicle body 10A. The operation member 80 can include a part of an electric switch, and further can be coupled to the electric switch. The electric switch is a mechanical-type electric switch whose connection state is changed by a push operation of a rider for the operation member 80, for example. The electric switch can be a touch panel, for example.

Preferably, the operating device 74 is provided to the base 76, and further includes a power-source switch 82 that is configured to switch turning ON/OFF of the power source of the control-target 20. The power-source switch 82 is arranged in the first part 76C of the base 76. The power-source switch 82 is arranged on the operation member mounted surface 76E. For example, the power-source switch 82 is a mechanical-type electric switch whose connection state is changed by a push operation of a rider. For example, the power-source switch 82 can be a touch panel. For example, in a state where a power source of the control-target 20 is turned OFF, if being continuously operated for equal to or more than a predetermined first time interval, the power-source switch 82 turns ON the power source of the control-target 20. For example, in a state where a power source of the control-target 20 is turned ON, if being continuously operated for equal to or more than a predetermined second time interval, the power-source switch 82 turns OFF the power source of the control-target 20. Preferably, the predetermined second time interval is longer than the predetermined first time interval. The power-source switch 82 can be omitted. The power-source switch 82 is arranged while interposing an interval from the operation member 80 in the predetermined direction X1.

Preferably, the operating device 74 further includes a first state display 84 that displays information related to a selected operation state among a plurality of operation states of the motor 32. The first state display 84 is configured to display a plurality of colors, and further to display a color corresponding to a selected operation state among a plurality of operation states of the motor 32. The first state display 84 is capable of displaying an assist mode that is selected by operation of the operation member 80. The first state display 84 includes a Light Emitting Diode (LED) that is capable of changing an emission color. The first state display 84 is configured to emit light of LED from a first light transmission portion that is formed on the operation member mounted surface 76E. The first state display 84 can be omitted.

The first state display 84 displays a selected assist mode by using difference in an emission color. For example, in a case where the first assist mode is selected, the first state display 84 emits light in blue color. For example, in a case where the second assist mode is selected, the first state display 84 emits light in yellow color. For example, in a case where the third assist mode is selected, the first state display 84 emits light in red color. For example, in a case where a mode for not driving the motor 32 is selected, the first state display 84 is turned off. For example, in a case where a walk mode is selected, the first state display 84 emits light or blinks in green color. Information related to colors corresponding to the modes can be stored in a storage 92 to be changeable, and a user can sets to colors corresponding to the modes. The first state display 84 is arranged between the power-source switch 82 and the operation member 80 in the predetermined direction X1.

Preferably, the operating device 74 further includes a second state display 86 that is provided to the base 76 and is configured to display information related to a state of the battery 34 that is provided in the human-powered vehicle 10. The second state display 86 includes a plurality of light emitting parts 5. The light emitting parts 5 are provided to the base 76. For example, the light emitting parts 5 include a first light emitting unit 86A, a second light emitting unit 86B, a third light emitting unit 86C, a fourth light emitting unit 86D, and a fifth light emitting unit 86E. Each of the light emitting parts 5 includes a second light transmission part 87 provided to the base 76 and at least one light emitting element. The second light transmission part 87 is formed in the operation member mounted surface 76E. The second light transmission part 87 is configured to emit light from the at least one light emitting element. The second state display 86 can be omitted. Each of the first to fifth light emitting units 86A, 86B, 86C, 86D, and 86E includes an LED. In a state where a power source of the control-target 20 is turned ON, the second state display 86 displays a remaining amount of the battery 34 by using the number of the first to fifth light emitting units 86A, 86B, 86C, 86D, and 86E to be turned on.

The light emitting parts 5 are arranged in a line around the operation member 80 while being spaced from each other. The first to fifth light emitting units 86A, 86B, 86C, 86D, and 86E are arranged in a predetermined direction while being spaced from each other in this order. For example, the first to fifth light emitting units 86A, 86B, 86C, 86D, and 86E are arranged around the operation member 80 in circular arc shape. The operation member 80 includes the power-source switch 82. For example, the second light transmission parts 87 included in the first to fifth light emitting units 86A, 86B, 86C, 86D, and 86E are arranged in a periphery of the power-source switch 82 in circular arc shape. The first state display 84 can be omitted.

In a case where the battery 34 is fully-charged, the second state display 86 is controlled such that all of the first to fifth light emitting units 86A, 86B, 86C, 86D, and 86E are turned on. The second state display 86 is controlled such that the fifth light emitting unit 86E, the fourth light emitting unit 86D, the third light emitting unit 86C, the second light emitting unit 86B, and the first light emitting unit 86A are turned off in this order as a remaining amount of the battery 34 reduces from a fully-charged state. If a remaining amount of the battery 34 is the lowest, the second state display 86 is controlled so as to turn off all of the first to fifth light emitting units 86A, 86B, 86C, 86D, and 86E. The operation member 80, the power-source switch 82, the first state display 84, and the second state display 86 are provided to the base 76 on an upper surface of the base 76 which is an operation surface to be exposed therefrom.

Figure 6:
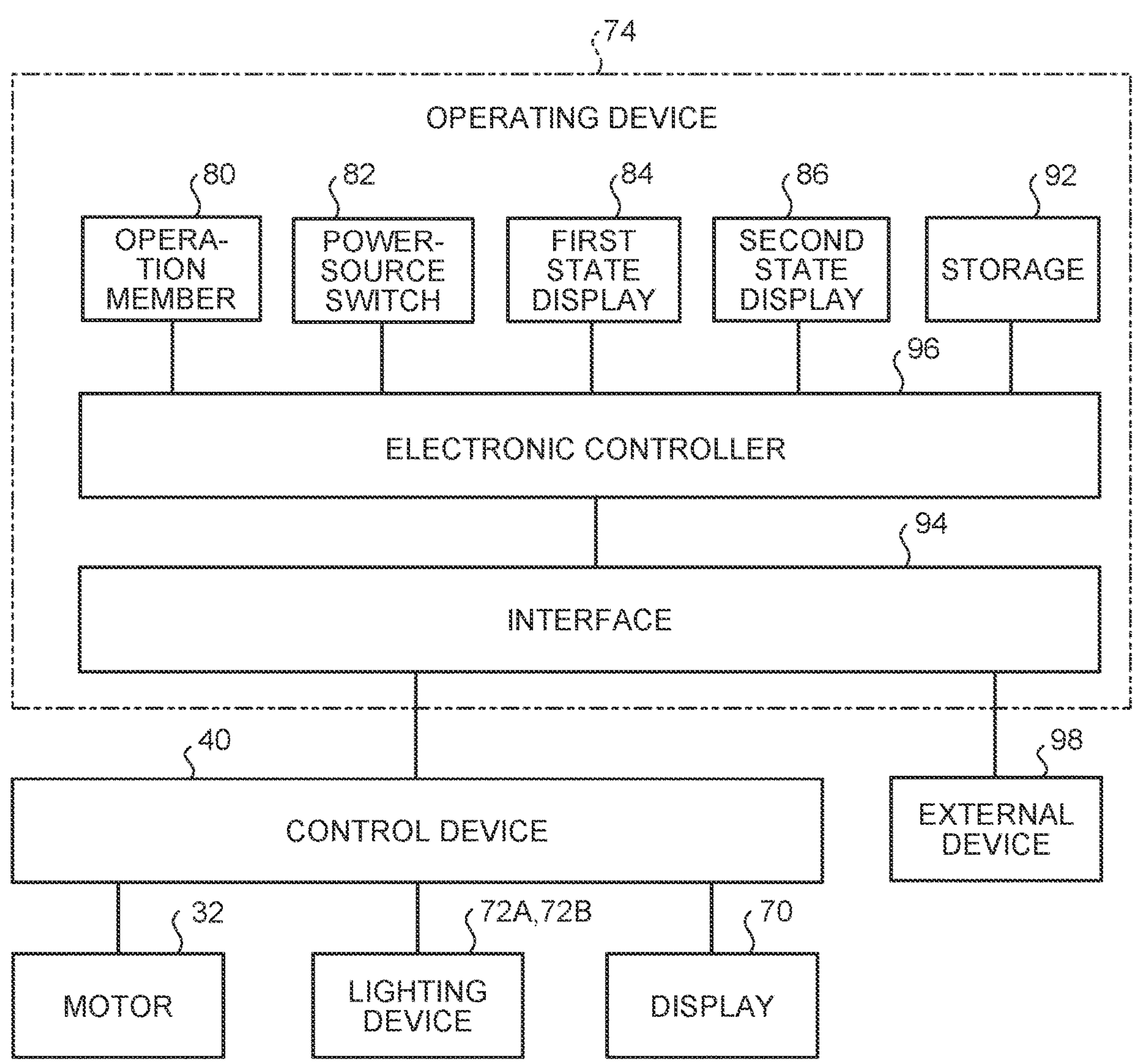
FIG. 6 is a block diagram illustrating an electric configuration of the operating device illustrated in FIGS. 4 and 5 according to the embodiment.

As illustrated in FIG. 6, the operating device 74 includes the operation member 80, the at least one interface 94, and the controller 96. The controller 96 is provided to the base 76. The controller 96 is electrically connected to the at least one interface 94, and is configured to cause the at least one interface 94 to output a control command to the control-target 20 in accordance with operation of the operation member 80. The controller 96 is configured to change at least one of the control-target 20 and a control command to the control-target 20. The controller 96 can be configured to change a control command without changing the control-target 20.

The operating device 74 further includes the power-source switch 82, the first state display 84, and the second state display 86. The operating device 74 includes the storage 92 that stores therein information related to at least one of the control-target 20 and a control command. The operation member 80, the power-source switch 82, the first state display 84, the second state display 86, and the storage 92 are electrically connected to the controller 96. The controller 96 and the interface 94 are electrically connected to each other. The interface 94 is connected to the control device 40 and an external device 98 to be able to communicate with each other by an electric cable or a wireless communication device 94D.

The external device 98 includes a personal computer, a cyclocomputer, a smartphone, a tablet computer, or the like. An application program for changing the control-target 20 of the operating device 74 is installed in the external device 98. A rider operates the external device 98 so as to start up the application program, and is able to transmit a predetermined signal for changing the control-target 20 of the operating device 74 from the external device 98 to the operating device 74. The external device 98 is capable of transmitting, to the operating device 74, a predetermined signal for changing a control command output from the operating device 74 to the control-target 20.

The controller 96 is configured to change at least one of the control-target 20 and a control command in response to a predetermined signal that is input via the at least one interface 94. The predetermined signal is input to the controller 96 from the external device 98 via the interface 94. The controller 96 stores information related to at least one of the control-target 20 corresponding to the input predetermined signal and a control command in the storage 92. The controller 96 is configured to rewrite at least a part of the information to be stored in the storage 92 in response to the predetermined signal. The controller 96 rewrites at least a part of information to be stored in the storage 92 each time when a predetermined signal for changing at least one of the control-target 20 and a control command is newly input. The controller 96 can store a flag in the storage 92, by using which changed at least one of the control-target 20 and a control command is able to be identified instead of rewriting information to be stored in the storage 92.

The controller 96 can be configured to change, if the operation member 80 is operated by a predetermined operation method, at least one of the control-target 20 and a control command. The controller 96 can be configured to change the control-target 20 in a predetermined order while the operation member 80 is continuously operated for equal to or more than a predetermined third time interval. For example, in a state where the motor 32 is selected as the control-target 20, if the operation member 80 is continuously operated for equal to or more than the predetermined third time interval, the controller 96 changes the control-target 20 from the motor 32 to the lighting devices 72A and 72B. In a state where the lighting devices 72A and 72B are selected as the control-targets 20, if the operation member 80 is continuously operated for equal to or more than the predetermined third time interval, the controller 96 changes the control-target 20 from the lighting devices 72A and 72B to the display 70. In a state where the display 70 is selected as the control-target 20, if the operation member 80 is continuously operated for equal to or more than the predetermined third time interval, the controller 96 changes the control-target 20 from the display 70 to the motor 32. The predetermined order for changing the control-target 20 can be set by a user.

The controller 96 causes the interface 94 to output a control command to the control-target 20 in response to operation of the operation member 80. In a case where the control-target 20 is changed to the motor 32, the controller 96 outputs a control command to the motor 32 in response to operation for the operation member 80. In a case where the motor 32 is selected as the control-target 20, a control command includes a first control command for controlling the motor 32. The first control command includes a command for selecting one of a plurality of operation states of the motor 32. For example, if a push operation is performed on the operation member 80, the controller 96 outputs a first control command to the motor 32.

For example, in a state where the first assist mode is selected, if a push operation is performed on the operation member 80, the controller 96 outputs a first control command to the motor 32, which changes an operation state of the motor 32 from the first assist mode to the second assist mode. In a state where the second assist mode is selected, if a push operation is performed on the operation member 80, the controller 96 outputs a first control command to the motor 32, which changes an operation state of the motor 32 from the second assist mode to the third assist mode. In a state where the third assist mode is selected, if a push operation is performed on the operation member 80, the controller 96 outputs a first control command to the motor 32, which changes an operation state of the motor 32 from the third assist mode to the first assist mode. Information related to a presently-set assist mode among the first to third assist modes is stored in the storage 50. The controller 96 is capable of outputting, to the motor 32, at least one of a first control command for switching between turning ON/OFF of the motor 32 in accordance with operation and a first control command for changing into a walk mode, in addition to selection of an assist mode, for example.

In a case where the control-target 20 is changed into the display 70, the controller 96 outputs a control command to the display 70 in response to operation performed on the operation member 80. In a case where the display 70 is selected as the control-target 20, a control command includes a second control command for controlling the display 70. The second control command includes a command for switching at least a part of a display screen of the display 70. For example, if a push operation is performed on the operation member 80, the controller 96 outputs a second control command to the display 70.

For example, in a state where a display screen is displayed on the display 70, the controller 96 can scroll the display screen while a push operation is being performed on the operation member 80, and if the push operation is released, can output a second control command for stopping the scrolling to the display 70. For example, the controller 96 can outputs a second control command to the display 70, which switches displaying and non-displaying of a display screen in response to operation in addition to the scrolling of a display screen. The controller 96 can output a second control command for switching a display screen to the display 70. In the switching of a display screen, the controller 96 sequentially switches a plurality of setting display screens. The setting display screen includes, for example, information related to a speed of the human-powered vehicle 10, information related to a traveling distance, information related to a remaining amount of the battery, and the like.

In a case where the control-target 20 is changed into the lighting devices 72A and 72B, the controller 96 outputs a control command to the lighting devices 72A and 72B in response to operation performed on the operation member 80. In a case where the lighting devices 72A and 72B are selected as the control-target 20, a control command includes a third control command for controlling the lighting devices 72A and 72B. The third control command includes a command for changing illuminance of the lighting devices 72A and 72B. For example, a push operation is performed on the operation member 80, the controller 96 outputs the third control command to the display 70.

For example, in a state where the lighting devices 72A and 72B are turned off, the controller 96 can output a third control command for gradually increasing illuminance of the lighting devices 72A and 72B to the lighting devices 72A and 72B while a push operation is being performed on the operation member 80. After illuminance of the lighting devices 72A and 72B becomes maximum, the controller 96 can output a third control command for gradually reducing illuminance of the lighting devices 72A and 72B while a push operation is being performed on the operation member 80 to the lighting devices 72A and 72B. In a state where the lighting devices 72A and 72B are turned off, if a push operation is performed on the operation member 80 once, the controller 96 can output a third control command for turning on the lighting devices 72A and 72B to the lighting devices 72A and 72B. In a state where the lighting devices 72A and 72B are turned on, if a push operation is performed on the operation member 80 once, the controller 96 can output a third control command for turning off the lighting devices 72A and 72B to the lighting devices 72A and 72B.

Figure 7:
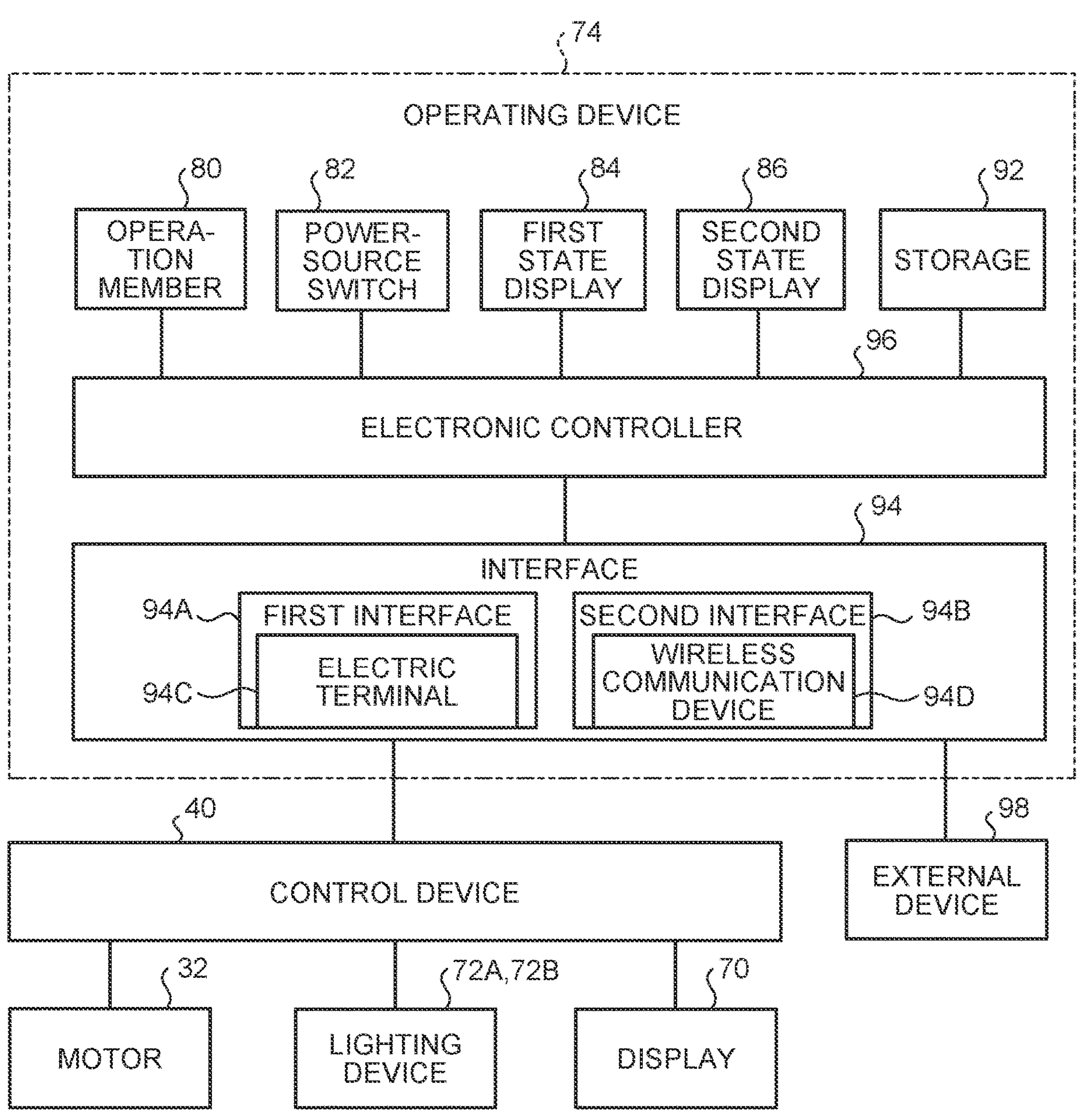
FIG. 7 is a block diagram illustrating a modification of the electric configuration of the operating device according to the embodiment.

As illustrated in FIG. 7, the at least one interface 94 included in the operating device 74 according to a modification includes a first interface 94A and a second interface 94B. The first interface 94A includes a connector that includes the electric terminal 94C. The second interface 94B includes the wireless communication device 94D. In a state where the electric terminal 94C and the control device 40 are connected to each other by using a communication cable, the controller 96 is capable of outputting a control command related to the motor 32, the lighting devices 72A and 72B, and the display 70 to the control device 40 via the first interface 94A with the use of wired communication. In a state where the electric terminal 94C and the external device 98 are connected to each other with the use of a communication cable, the controller 96 is capable of receiving a predetermined signal from the external device 98 via the first interface 94A with the use of wired communication.

In a state where communication between the wireless communication device 94D and the control device 40 is established, the controller 96 can output a control command related to the motor 32, the lighting devices 72A and 72B, and the display 70 to the control device 40 via the second interface 94B by using wireless communication. In a state where wireless communication between the wireless communication device 94D and the external device 98 is established, the controller 96 is capable of receiving a predetermined signal from the external device 98 via the second interface 94B with the use of wireless communication. The second interface 94B can be omitted.

Each of the first state display 84 and the second state display 86 can be constituted of a liquid crystal display panel or an organic EL panel. In a case where each of the first state display 84 and the second state display 86 is constituted of a liquid crystal display panel or an organic EL panel, the first state display 84 and the second state display 86 can be configured as a single liquid crystal display panel or a single organic EL panel.

The control-targets 20 can include one, two, three or more of the transmission 42, the front suspension 44, the rear suspension 46, the seatpost 48, the chain guide 42B, the motor 32, the display 70, the lighting device 72A, and the lighting device 72B.

Figure 8:
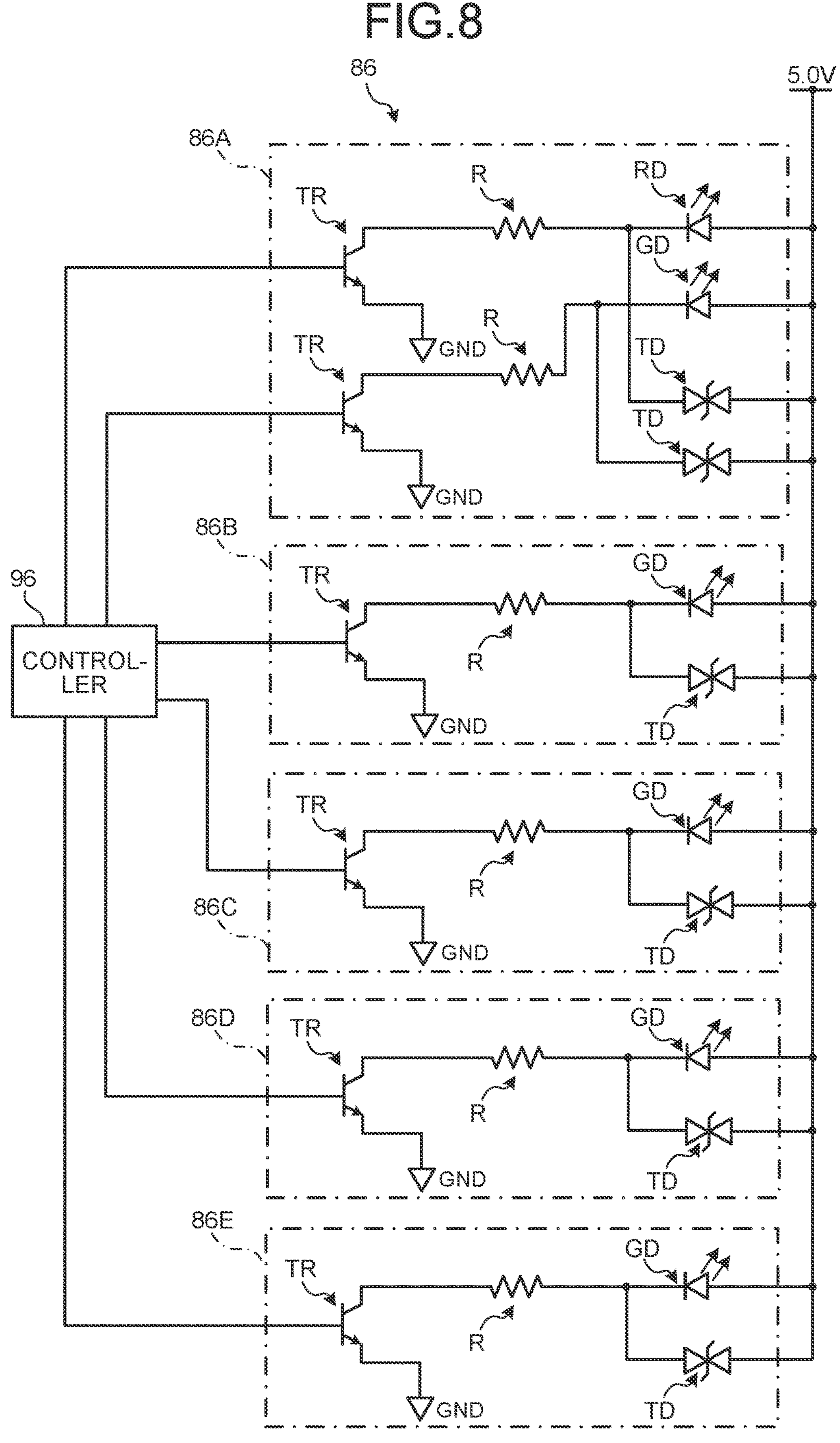
FIG. 8 is a diagram illustrating a circuit configuration example of a light emitting part according to the embodiment.

As illustrated in FIG. 8, the second state display 86 includes the first to fifth light emitting units 86A, 86B, 86C, 86D, and 86E. The first light emitting unit 86A includes two light emitting elements RD and GD. For example, the light emitting element RD is an LED that is turned red when being energized. For example, the light emitting element GD is an LED that is turned green when being energized. An anode of each of the light emitting elements RD and GD is connected to a power source line having a predetermined first voltage, for example. A protection diode TD is connected between a cathode and a power source line of each of the light emitting elements RD and GD. Cathodes of the light emitting elements RD and GD are connected to respective one ends of different resistances R. The other ends of the resistances R are connected to respective collectors of different transistors TR. An emitter of each of the transistors TR is connected to a ground GND, and further a base thereof is connected to the controller 96. The predetermined first voltage is 5.0 V, for example.

Each of the second to fifth light emitting units 86B, 86C, 86D, and 86E includes the light emitting element GD. Anodes of the light emitting elements GD are connected to a power source line having the predetermined first voltage, for example. The protection diode TD is connected between a cathode and a power source line of each of the light emitting elements GD. Cathodes of the light emitting elements GD are connected to respective one ends of the different resistances R. The other ends of the resistances R are connected to respective collectors of the different transistors TR. Emitters of the transistors TR are connected to the ground GND, and bases thereof are connected to the controller 96.

The controller 96 controls the light emitting parts 5, and is configured to cause at least one of the light emitting parts 5 to emit light in accordance with a remaining amount of the battery 34 that is provided in the human-powered vehicle 10. For example, the controller 96 executes Pulse Width Modulation (PWM) control on at least one of the first to fifth light emitting units 86A, 86B, 86C, 86D, and 86E so as to cause it to emit light.

The controller 96 outputs a High-level signal to a base of the transistor TR connected to the light emitting element RD of the first light emitting unit 86A so as to turn ON the transistor TR and turn red the light emitting element RD. The controller 96 outputs a Low-level signal to a base of the transistor TR connected to the light emitting element RD of the first light emitting unit 86A so as to turn OFF the transistor TR and turn off the light emitting element RD. The High-level signal corresponds to a signal having the predetermined first voltage. The Low-level signal corresponds to a signal having a predetermined second voltage. The predetermined second voltage is a voltage of the ground.

The controller 96 outputs a High-level signal to a base of the transistor TR connected to the light emitting element GD of the first light emitting unit 86A so as to turn ON the transistor TR and turn green the light emitting element GD. The controller 96 outputs a Low-level signal to a base of the transistor TR connected to the light emitting element GD of the first light emitting unit 86A so as to turn OFF the transistor TR and turn off the light emitting element GD.

The controller 96 outputs a High-level signal to bases of the transistors TR connected to the light emitting elements GD of the second to fifth light emitting units 86B, 86C, 86D, and 86E so as to turn ON the transistors TR and turn green the light emitting elements GD. The controller 96 outputs a Low-level signal to bases of the transistors TR connected to the light emitting elements GD of the second to fifth light emitting units 86B, 86C, 86D, and 86E so as to turn OFF the transistors TR and turn off the light emitting elements GD.

The controller 96 is configured to control the light emitting parts 5 such that a light amount of the at least one light emitting part 5, in a case where the number of the at least one light emitting part 5 that simultaneously emits light is N (N is natural number that is equal to or more than one), is more than a light amount of each of the at least one light emitting part 5 in a case where the number of the at least one light emitting part 5 that simultaneously emits light is N+1.

For example, as illustrated in FIG. 9, in a case where the number of the at least one light emitting part 5 that is simultaneously turned on is one, the controller 96 sets On-Duty in PWM control of LED of each of the light emitting parts 5 to 100%. For example, as illustrated in FIG. 9, in a case where the number of the at least one light emitting part 5 that is simultaneously turned on is two, the controller 96 sets On-Duty in PWM control of LED of each of the light emitting parts 5 to 90%. For example, as illustrated in FIG. 9, in a case where the number of the at least one light emitting part 5 that is simultaneously turned on is three, the controller 96 sets On-Duty in PWM control of LED of each of the light emitting parts 5 to 80%. For example, as illustrated in FIG. 9, in a case where the number of the at least one light emitting part 5 that is simultaneously turned on is four, the controller 96 sets On-Duty in PWM control of LED of each of the light emitting parts 5 to 70%. For example, as illustrated in FIG. 9, in a case where the number of the at least one light emitting part 5 that is simultaneously turned on is five, the controller 96 sets On-Duty in PWM control of LED of each of the light emitting parts 5 to 50%.

The controller 96 includes a counter. The counter executes counting of a predetermined number during a predetermined time interval T, for example. In the present embodiment, the predetermined time interval is a period (10 msec) of 100 Hz and the predetermined number is 10. The counter repeats operation for counting from 1 up to 10 at intervals of 1/10 msec. The counting period of the counter and the number of counts are not particularly limited.

Figure 10:
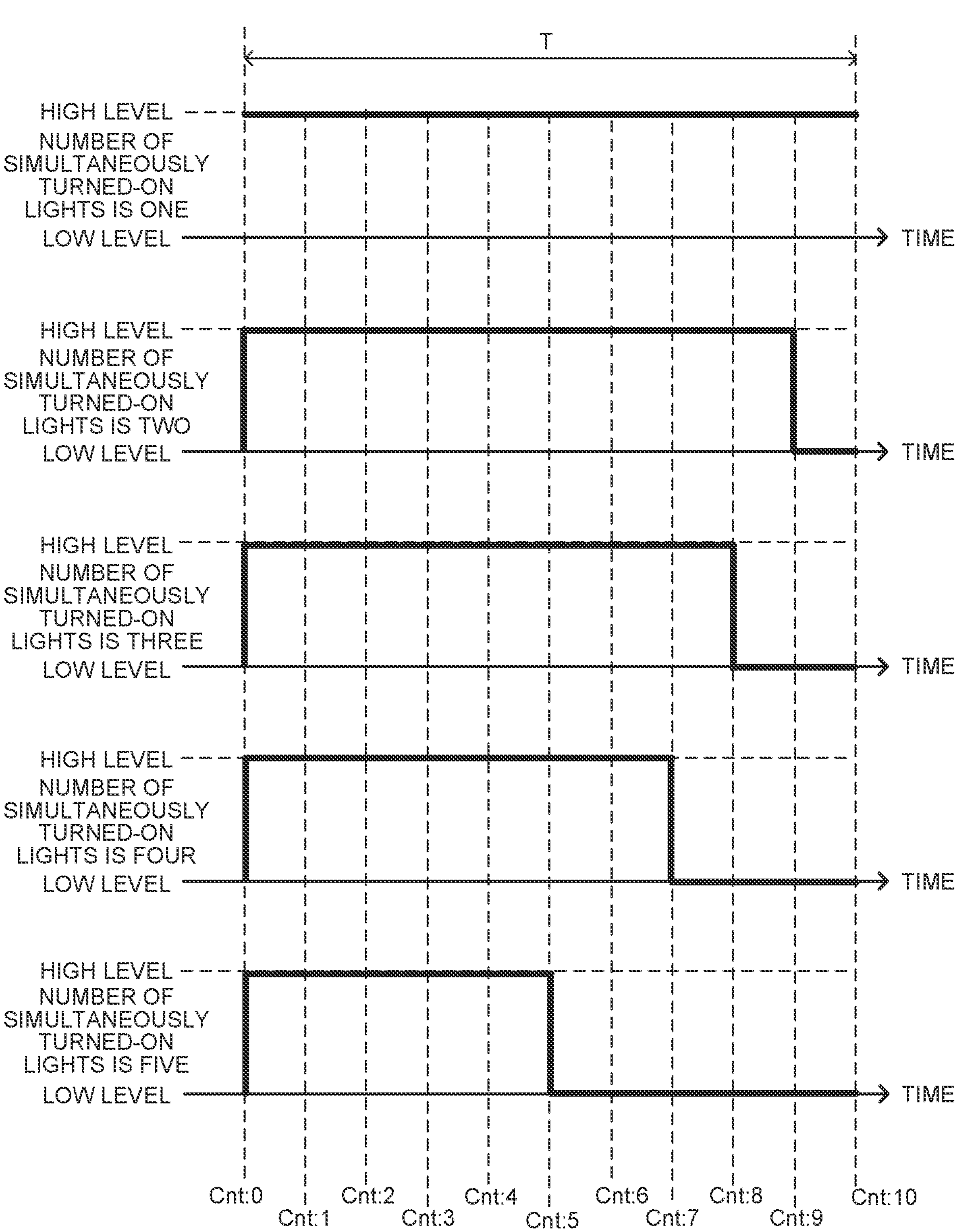
FIG. 10 is a timing diagram illustrating one example of a control timing of the light emitting part according to the embodiment.

As illustrated in FIG. 10, for example, in a case where five LEDs included in the light emitting part 5 are simultaneously turned on, the controller 96 outputs a High-level signal to the first to fifth light emitting units 86A, 86B, 86C, 86D, and 86E during a time interval of 5/10 msec from count 0 up to count 5. Next, a controller 95 outputs a Low-level signal to the first to fifth light emitting units 86A, 86B, 86C, 86D, and 86E.

For example, in a case where four LEDs included in the light emitting part 5 are simultaneously turned on, the controller 96 outputs a High-level signal to the first to fourth light emitting units 86A, 86B, 86C, and 86D during a time interval of 7/10 msec from count 0 up to count 7. Next, the controller 95 outputs a Low-level signal to the first to fourth light emitting units 86A, 86B, 86C, and 86D.

For example, in a case where three LEDs included in the light emitting part 5 are simultaneously turned on, the controller 96 outputs a High-level signal to the first to third light emitting units 86A, 86B, and 86C during a time interval of 8/10 msec from count 0 up to count 8. Next, the controller 95 outputs a Low-level signal to the first to third light emitting units 86A, 86B, and 86C.

For example, in a case where two LEDs included in the light emitting part 5 are simultaneously turned on, the controller 96 outputs a High-level signal to the first and second light emitting units 86A and 86B during a time interval of 9/10 msec from count 0 up to count 9. Next, the controller 95 outputs a Low-level signal to the first and second light emitting units 86A and 86B. For example, in a case where one LED included in the light emitting part 5 is turned on, the controller 96 continuously outputs a High-level signal to the first light emitting unit 86A.

In a case where the second state display 86 displays a remaining amount of the battery 34, the controller 96 executes the process illustrated in FIG. 11. The controller 96 determines whether or not a remaining amount of the battery 34 is 81% to 100% (Step S1). In a case where determining that a remaining amount of the battery 34 is 81% to 100% (Step S1: Yes), the controller 96 determines whether or not a count is equal to or more than five (Step S2). In a case where determining that a count is not equal to or more than five (Step S2: No), the controller 96 turns on the first to fifth light emitting units 86A, 86B, 86C, 86D, and 86E, and ends the processing (Step S3). For example, the controller 96 turns green the light emitting elements GD of the first to fifth light emitting units 86A, 86B, 86C, 86D, and 86E, and ends the processing. In a case where determining that a count is equal to or more than five (Step S2: Yes), the controller 96 turns off the first to fifth light emitting units 86A, 86B, 86C, 86D, and 86E, and ends the processing (Step S4).

In a case where determining that a remaining amount of the battery 34 is not 81% to 100% (Step S1: No), the controller 96 determines whether or not a remaining amount of the battery 34 is 61% to 80% (Step S5). In a case where determining that a remaining amount of the battery 34 is 61% to 80% (Step S5: Yes), the controller 96 determines whether or not a count is equal to or more than seven (Step S6). In a case where determining that a count is not equal to or more than seven (Step S6: No), the controller 96 turns on the first to fourth light emitting units 86A, 86B, 86C, and 86D, and ends the processing (Step S7). For example, the controller 96 turns green the light emitting elements GD of the first to fourth light emitting units 86A, 86B, 86C, and 86D, and ends the processing. In a case where determining that a count is equal to or more than seven (Step S6: Yes), the controller 96 turns off the first to fourth light emitting units 86A, 86B, 86C, and 86D, and ends the processing (Step S8).

In a case where determining that a remaining amount of the battery 34 is not 61 to 80% (Step S5: No), the controller 96 determines whether or not a remaining amount of the battery 34 is 41% to 60% (Step S9). In a case where determining that a remaining amount of the battery 34 is 41% to 60% (Step S9: Yes), the controller 96 determines whether or not a count is equal to or more than eight (Step S10). In a case where determining that a count is not equal to or more than eight (Step S10: No), the controller 96 turns on the first to third light emitting units 86A, 86B, and 86C, and ends the processing (Step S11). For example, the controller 96 turns green the light emitting elements GD of the first to third light emitting units 86A, 86B, and 86C, and ends the processing. In a case where determining that a count is equal to or more than eight (Step S10: Yes), the controller 96 turns off the first to third light emitting units 86A, 86B, and 86C, and ends the processing (Step S12).

In a case where determining that a remaining amount of the battery 34 is not 41% to 60% (Step S9: No), the controller 96 determines whether or not a remaining amount of the battery 34 is 21% to 40% (Step S13). In a case where determining that a remaining amount of the battery 34 is 21% to 40% (Step S13: Yes), the controller 96 determines whether or not a count is equal to or more than nine (Step S14). In a case where determining that a count is not equal to or more than nine (Step S14: No), the controller 96 turns on the first and second light emitting units 86A and 86B, and ends the processing (Step S15). For example, the controller 96 turns green the light emitting elements GD of the first and second light emitting units 86A and 86B, and ends the processing. In a case where determining that a count is equal to or more than nine (Step S14: Yes), the controller 96 turns off the first and second light emitting units 86A and 86B, and ends the processing (Step S16).

In a case where determining that a remaining amount of the battery 34 is not 21% to 40% (Step S13: No), the controller 96 turns on the first light emitting unit 86A, and ends the processing (Step S17). For example, the controller 96 turns green the light emitting element GD of the first light emitting unit 86A, and ends the processing. In a case where a remaining amount of the battery 34 is 11% to 20%, the controller 96 can be configured to turn green the light emitting element GD of the first light emitting unit 86A, and in a case where a remaining amount of the battery 34 is 10%, turn red the light emitting element RD of the first light emitting unit 86A.

The expression of "at least one" described in this specification means "one or more" desired choices. The expression of "at least one" described in this specification means, as one example, "one choice alone" or "both of two choices" when there preset two choices. The expression of "at least one" described in this specification means, as another example, "one choice alone" or "combination of two or more arbitrary choices" when the number of choices is equal to or more than three.

What is claimed is:

1. An operating device of a human-powered vehicle, the operating device comprising:

a base at least partly embedded in a vehicle body of the human-powered vehicle;

an operation member provided to the base;

at least one of a connector having an electric terminal and a wireless communication device operatively coupled to the operation member;

an electronic controller provided to the base and electrically connected to the at least one of the connector and the wireless communication device, the electronic controller being configured to cause the at least one of the connector and the wireless communication device to output a control command to a control-target in accordance with an operation of the operation member; and a storage that stores therein information related to the at least one of the control-target and the control command, the electronic controller being configured to be capable of changing for a current operation of the operation member at least one of the control-target and the control command associated with a previous operation of the operation member based on operation of the operation member, the previous operation and the current operation being the same type of operation of the operation member, the same type of operation of the operation member being operation of the operation member for the same amount of time.

2. The operating device according to claim 1, wherein the electronic controller is configured to change at least one of the control-target and the control command in accordance with a predetermined signal that is input via the at least one interface.

3. The operating device according to claim 2, wherein the electronic controller is configured to rewrite at least a part of the information stored in the storage in accordance with the predetermined signal.

4. The operating device according to claim 2, wherein the predetermined signal is input to the electronic controller from an external device via the at least one interface.

5. The operating device according to claim 1, wherein the electronic controller is configured to change the at least one of the control-target and the control command in a state where the operation member is operated by a predetermined operation method.

6. The operating device according to claim 1, wherein the control-target includes a motor that is configured to provide a propelling force to the human-powered vehicle, and the control command includes a first control command for controlling the motor.

7. The operating device according to claim 6, wherein the motor is configured to be controlled in any of a plurality of operation states, and the first control command includes a command for selecting one operation state from among the plurality of operation states.

8. The operating device according to claim 7, further comprising:

a first state display configured to display information related to the one operation state selected from among the plurality of operation states.

9. The operating device according to claim 8, wherein the first state display is configured to:

display a plurality of colors; and display a color corresponding to the one operation state selected from among the plurality of operation states.

10. The operating device according to claim 1, wherein the control-target includes a display, and the control command includes a second control command for controlling the display.

11. The operating device according to claim 10, wherein the second control command includes a command for switching at least a part of a display screen of the display.

12. The operating device according to claim 1, wherein the control-target includes a lighting device, and the control command includes a third control command for controlling the lighting device.

13. The operating device according to claim 12, wherein the third control command includes a command for changing an illuminance of the lighting device.

14. The operating device according to claim 1, further comprising:

a second state display that is provided to the base and is configured to display information related to a state of a battery provided in the human-powered vehicle.

15. The operating device according to claim 14, wherein the second state display includes a plurality of light emitting parts, and the electronic controller is configured to:

control the plurality of light emitting parts such that at least one of the plurality of light emitting parts emits light in accordance with a remaining amount of a battery that is provided to the human-powered vehicle; and control the plurality of light emitting parts such that a light amount of each of the at least one light emitting part in a case where a number of the at least one light emitting part is "N" (N is natural number that is equal to or more than one) is larger than a light amount of each of the at least one light emitting part in a case where a number of the at least one light emitting part is "N+1".

16. The operating device according to claim 1, further comprising:

a power-source switch that is provided to the base, and that is configured to switch between turning ON/OFF of a power source of the control-target.

17. The operating device according to claim 1, further comprising:

an engaging part provided to a first end part of the base in a predetermined direction, and configured to be engaged with the vehicle body of the human-powered vehicle; and a fastener attachment part provided to a second end part of the base in the predetermined direction, and to which a fastener member coupled to the vehicle body of the human-powered vehicle is attached.

18. The operating device according to claim 17, wherein the operation member is arranged between the engaging part and the fastener attachment part in the predetermined direction.

19. A human-powered vehicle comprising:

the operating device according to claim 1.

20. An operating device of a human-powered vehicle, the operating device comprising:

a base;

an operation member provided to the base;

a plurality of light emitting parts provided to the base, each light emitting part being spaced from an adjacent light emitting part; and an electronic controller configured to:

control the plurality of light emitting parts such that at least one of the plurality of light emitting parts emits light in accordance with a remaining amount of a battery that is provided to the human-powered vehicle; and control the plurality of light emitting parts such that a light amount of each of the at least one light emitting part when a number of the at least one light emitting part is "N" (N is natural number that is equal to or more than one) is larger than a light amount of each of the at least one light emitting part when a number of the at least one light emitting part is "N+1", the emitted light amount by each of the at least one light emitting part being a non-zero amount when the number of the at least one light emitting part is "N" and "N+1", each of the at least one light emitting parts being configured to emit the same light amount when illuminated.

21. The operating device according to claim 20, wherein the plurality of light emitting parts is arranged in a line around the operation member while being spaced from each other.

* * * * *